(12) United States Patent
    Bhatia

(10) Patent No.: US 8,990,258 B2
(45) Date of Patent: Mar. 24, 2015

(54) SELF-SERVICE DATABASE REPORTING SYSTEMS AND METHODS

(75) Inventor: Sanjay Bhatia, Atlanta, GA (US)

(73) Assignee: Izenda, Inc., Atlanta, GA (US)

( * ) Notice: Subject to any disclaimer, the term of this patent is extended or adjusted under 35 U.S.C. 154(b) by 1071 days.

(21) Appl. No.: 12/907,184

(22) Filed: Oct. 19, 2010

(65) Prior Publication Data

US 2011/0035744 A1    Feb. 10, 2011

Related U.S. Application Data

(63) Continuation-in-part of application No. 11/967,159, filed on Dec. 29, 2007, now Pat. No. 7,840,600.

(60) Provisional application No. 60/882,822, filed on Dec. 29, 2006.

(51) Int. Cl.
    *G06F 17/30*    (2006.01)
    *G06F 3/0484*   (2013.01)

(52) U.S. Cl.
    CPC ...... *G06F 17/3056* (2013.01); *G06F 17/30893* (2013.01); *G06F 3/0484* (2013.01)
    USPC .......................................... 707/793; 707/768

(58) Field of Classification Search
    CPC ............................................... G06F 17/30943
    USPC ................. 707/1, 793, 768; 705/26, 28
    See application file for complete search history.

(56) References Cited

U.S. PATENT DOCUMENTS

| | | | |
|---|---|---|---|
| 5,970,475 A | 10/1999 | Barnes et al. | |
| 6,658,432 B1* | 12/2003 | Alavi et al. | 707/1 |
| 6,831,668 B2 | 12/2004 | Cras et al. | |
| 7,383,215 B1* | 6/2008 | Navarro et al. | 705/36 R |
| 7,908,659 B2* | 3/2011 | Jeffries et al. | 726/25 |
| 2002/0152332 A1 | 10/2002 | Rensin et al. | |
| 2003/0120557 A1* | 6/2003 | Evans et al. | 705/26 |
| 2004/0085316 A1 | 5/2004 | Malik | |
| 2004/0093559 A1 | 5/2004 | Amaru et al. | |
| 2005/0223368 A1* | 10/2005 | Smith et al. | 717/128 |
| 2005/0267835 A1 | 12/2005 | Condron et al. | |
| 2006/0112123 A1 | 5/2006 | Clark et al. | |
| 2007/0073759 A1* | 3/2007 | El-Sabbagh | 707/102 |
| 2008/0306840 A1* | 12/2008 | Houlihan et al. | 705/28 |
| 2010/0161644 A1* | 6/2010 | Crim et al. | 707/768 |

* cited by examiner

*Primary Examiner* — Apu Mofiz
*Assistant Examiner* — Chelcie Daye
(74) *Attorney, Agent, or Firm* — Clements Bernard PLLC; Christopher L. Bernard; Lawrence A. Baratta, Jr.

(57) ABSTRACT

The present disclosure enables users to interactively create, customize, and execute reports on data stored in databases using only a web browser. The user can create, customize, and execute reports by selecting various report elements including, for example, data sources, fields, filters, labels, charts, dashboards, and the like. Advantageously, the present invention enables users to create the reports through an Internet connection, without any special software, such as web browser plug-ins, database applications, and the like, without knowledge of data access languages, such as SQL, and without direct access to a database server. The present invention can directly connect to a plurality of different database types through a virtual or physical network connection. It fully functions without requiring the creation of additional configuration items like catalogs, models or secondary schemas by a programmer or database administrator (DBA).

16 Claims, 29 Drawing Sheets

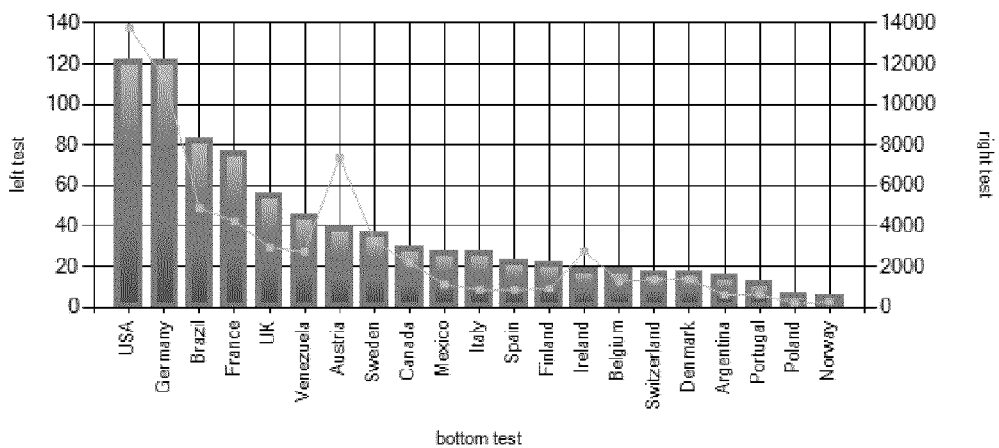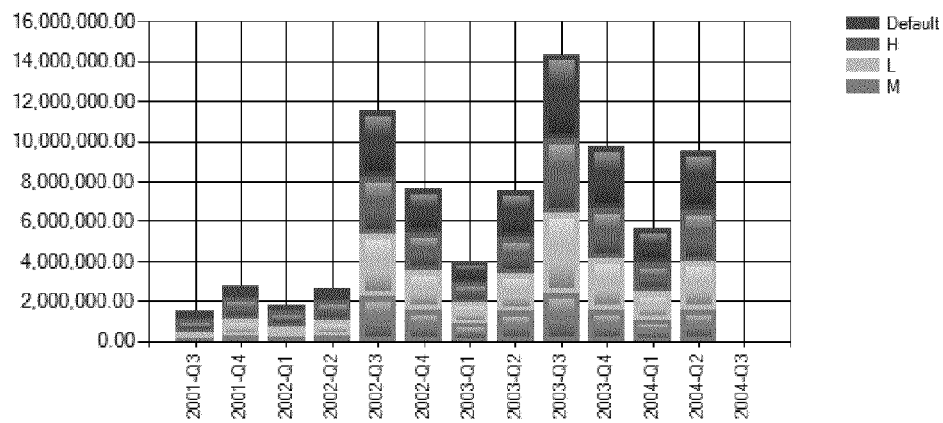
FIG. 25

| Id | ParentId | Name |
|----|----------|----------|
| 1  | 0        | Beverages |
| 2  | 1        | Chai |
| 3  | 1        | Chang |

Beverages    2702

| Product ▼ |
|---|
| Chai |
| Chang |
| Chartreuse verte |
| Côte de Blaye |
| Guaraná Fantástica |
| Ipoh Coffee |
| Lakkalikööri |
| Laughing Lumberjack Lager |
| Outback Lager |
| Rhönbräu Klosterbier |
| Sasquatch Ale |
| Steeleye Stout |

Condiments   2704

| Product ▼ |
|---|
| Aniseed Syrup |
| Chef Anton's Cajun Seasoning |
| Chef Anton's Gumbo Mix |
| Genen Shouyu |
| Grandma's Boysenberry Spread |
| Gula Malacca |
| Louisiana Fiery Hot Pepper Sauce |
| Louisiana Hot Spiced Okra |
| Northwoods Cranberry Sauce |
| Original Frankfurter grüne Soße |
| Sirop d'érable |
| Vegie-spread |

Confections   2706

| Product ▼ |
|---|
| Chocolade |
| Gumbär Gummibärchen |
| Maxilaku |

*FIG. 27*

| | Report List | New | Print | | | | | Results | 1000 | Design |
| --- | --- | --- | --- | --- | --- | --- | --- | --- | --- | --- |
| Pivot | OrderDate | | Group(Year) | | | | | | | |
| | Show Filters | Add Field | ... | | Delete Field | ... | | Update Results | | |

| Total Due | 2001 | 2002 | 2003 | 2004 |
| --- | --- | --- | --- | --- |
| $618.81 | 0 | 14 | 0 | 0 |
| $502.62 | 0 | 45 | 148 | 387 |
| $388.80 | 0 | 9 | 0 | 0 |
| $411.77 | 0 | 0 | 0 | 0 |
| $696.81 | 0 | 0 | 9 | 16 |
| $18,114.52 | 0 | 820 | 820 | 2,869 |
| $693.33 | 0 | 16 | 0 | 0 |
| $151.00 | 0 | 0 | 3 | 10 |
| $396.28 | 0 | 9 | 18 | 72 |
| $69,442.12 | 0 | 1,571 | 10,998 | 34,564 |
| $731.38 | 0 | 0 | 0 | 66 |
| $7,465.51 | 0 | 0 | 169 | 676 |
| $854.18 | 0 | 19 | 0 | 39 |
| $767.05 | 0 | 35 | 35 | 156 |
| $504.64 | 0 | 0 | 0 | 11 |
| $13,401.15 | 0 | 0 | 0 | 910 |

SELF-SERVICE DATABASE REPORTING SYSTEMS AND METHODS

CROSS-REFERENCE TO RELATED APPLICATION(S)

The present non-provisional patent application is a continuation-in-part of U.S. patent application Ser. No. 11/967,159, filed Dec. 29, 2007 now U.S. Pat. No. 7,840,600, and entitled "SYSTEMS AND METHODS FOR INTERACTIVELY CREATING, CUSTOMIZING, AND EXECUTING REPORTS OVER THE INTERNET," which claims priority to U.S. Provisional Patent Application Ser. No. 60/882,822, filed Dec. 29, 2006, and entitled "A METHOD AND SYSTEM THAT ENABLES THE CREATION, CUSTOMIZATION AND EXECUTION OF REPORTS VIA THE INTERNET," the disclosures of which are incorporated in full by reference herein.

FIELD OF THE INVENTION

The present invention relates generally to database system and methods. More specifically, the present invention provides systems and methods for self-service database reporting using a web browser to create a user interface to interactively connect to a plurality of database types to create, customize, and execute reports.

BACKGROUND OF THE INVENTION

A computer database is a structured collection of records or data that is stored in a computer system so that a computer program or person using a query language can consult data stored in the database to answer queries or provide reports. Organizations typically utilize databases to store data from business activity, surveys, measurements, markets, and the like. These databases can contain data sources implemented as tables, views, indices, and other forms that contain related data elements. These data elements generally have a name, data type, storage limits, and other descriptive characteristics. For example, a customer database could have an "address" table which contains a "city" field. This field could have a length limit of 80 characters and could require that it is not blank or NULL. Programmers and database administrators (DBA) utilize sophisticated tools, programming languages like C, and query languages like Structured Query Language (SQL) to execute reports on these relational databases.

A report is a set of relevant data source elements, such as fields, filters, charting details, formatting options, and the like, used by a system to generate usable outputs from raw relational data that can eventually be viewed, printed, shared or loaded into another application. Conventionally, what is commonly called a report is actually the report output, i.e. charts, tables, grids, etc. Reports and report outputs are utilized by organizations for a variety of purposes, such as, for example, marketing, sales, financial reporting, forecasting, trend analysis, and the like. Reports and report outputs can be stored in a file system or database in a binary or text format for future execution.

Conventionally, multiple web applications include modules that allow a user to generate a canned report which includes a predefined set of characteristics. To generate a customized report, a reporting module must be upgraded by a programmer or a skilled database administrator (DBA). The upgrader must usually define how data sources are combined and selected in a data access language like SQL. A programmer may need to redesign software code so the appropriate report output can be generated with the required customization. Existing reporting platforms and frameworks make the process simpler, but still require significant involvement from programmers and database administrators. They also require network protocols, network ports and security access only available to someone with proper clearance on the same physical network. Conventionally, report customization can not be done over the Hypertext Transfer Protocol (HTTP) alone using a standard browser. A system that permits users with only basic computer literacy to design or customize reports would have great value by eliminating the need for technical persons to be involved when new reporting requirements emerge. Custom designed reporting modules for applications require significant effort in terms of programming, deployment, and testing when a change needs to be made. The cost of maintaining such systems is high and there is significant risk of introducing bugs when software is updated.

Organizations have moved to web-based systems which advantageously remove the requirements to include applications on a user's specific computer. While many reporting systems exist for specific web applications, each system must be custom designed for a specific database or application. Reporting tools exist that simplify the process and reduce the risk of adding web-based reporting to a web application. These tools, however, require the use of special developer applications that must be installed, configured and secured on a computer. Additionally, these do not operate over HTTP alone. Organizations select web-based platforms for their applications to avoid the complexity of installing and configuring software. Having any module of a web application that cannot run over the web eliminates many of the advantages that the web platform provides. Furthermore, these tools can only be used by experts with knowledge of database administration and software programming. There is a need, however, for solutions that can be maintained entirely over the web without the involvement of programmers and database administrators.

BRIEF SUMMARY OF THE INVENTION

In various exemplary embodiments, the present invention provides methods and systems for enabling users to interactively create, customize, and execute reports on data stored in databases using only a web browser. The user can create, customize, and execute reports by selecting various report elements including, for example, data sources, fields, filters, labels, charts, dashboards, and the like. These can be selected though a web browser that includes an instance of a system connected to an appropriate data source. Advantageously, the present invention enables users to create the reports through an Internet connection, without any special software, such as web browser plug-ins, database applications, and the like, without knowledge of data access languages, such as SQL, and without direct access to a database server. The present invention can directly connect to a plurality of different database types through a virtual or physical network connection. It fully functions without requiring the creation of additional configuration items like catalogs, models or secondary schemas by a programmer or database administrator (DBA).

BRIEF DESCRIPTION OF THE DRAWINGS

The present invention is illustrated and described herein with reference to the various drawings, in which like reference numbers denote like method steps and/or system components, respectively, and in which:

FIG. 25 is a UI screen of a combined line and bar chart and a stacked bar graph according to an exemplary embodiment of the present invention;

FIGS. 26-27 are UI screens and tables of a self-join feature for parent-child relationships according to an exemplary embodiment of the present invention;

FIG. 29 is a UI screen of pivoted table customization according to an exemplary embodiment of the present invention.

DETAILED DESCRIPTION OF THE INVENTION

Figure 1:
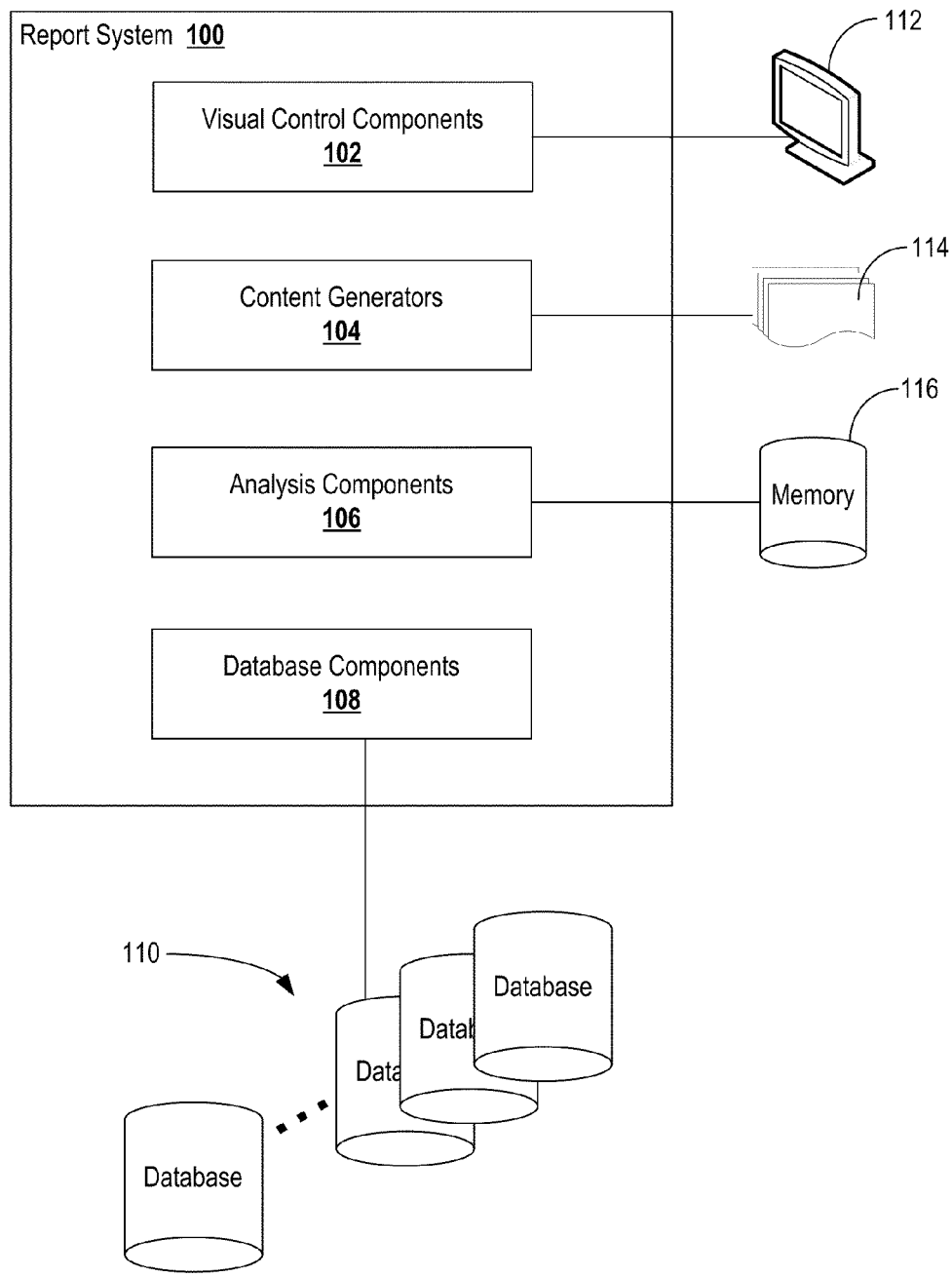
FIG. 1 is a block diagram of a report system including visual control components, content generators, analysis components, and database components, according to an exemplary embodiment of the present invention.

In various exemplary embodiments, the present invention provides systems and methods for self-service database reporting using a web browser to create a user interface to interactively connect to a plurality of database types to create, customize, and execute reports. The user can interactively create, customize, and execute reports by selecting various report elements including, for example, data sources, fields, filters, labels, charts, dashboards, and the like. These can be selected though a web site that includes an instance of a system connected to an appropriate data source. Advantageously, the present invention enables users to create the reports through an Internet connection, without any special software, such as web browser plug-ins, database applications, and the like, without knowledge of data access languages, such as SQL, and without direct access to a database server. The present invention can directly connect to the data source through a virtual or physical network connection. It fully functions without requiring the creation of additional configuration items like catalogs, models or secondary schemas by a programmer or database administrator (DBA). That is, the present invention enables end-users to securely create and customize their own reports without involving a programmer or database expert and integrates within an application's security, navigation, and appearance.

In the present invention, the report itself contains no data, but rather it merely includes definitions on how report outputs are generated from a database. For example, outputs can be in any binary file format, such as, for example, HyperText Markup Language (HTML), Portable Document Format (PDF), Microsoft Excel (XLS, XLSX), Microsoft Word (DOC, DOCX), Extensible Markup Language (XML), and the like. Additionally, the outputs can include multiple visual elements, such as charts, grids, tables, and the like. This report can be stored in a file system or database in a binary or text format for future execution.

The present invention includes a system of software components that utilize metadata analysis techniques to present a web-based user interface (UI) that significantly reduces the number and complexity of decisions a user needs to make during a report design process. Specifically, the present invention includes server-side components and browser-side components working together to enable custom-generated reports from any type of database. Additionally, the present invention is configured with knowledge of specific databases, such as Oracle, Microsoft SQL Server, MySQL, DB2, Sybase and the like. This knowledge is used to allow custom generated reports without any custom development. For example, the UI is adaptive responsive to the type of database. Accordingly, the UI only presents capabilities which are tailored to the specific database type. Importantly, the web-based UI created by the present invention is configured to eliminate invalid report choices thereby limiting a user to only valid choices preventing what does not work. Also, the present invention utilizes the knowledge to significantly reduce the likelihood of the end user designing a report which the database cannot execute. Reports can be generated within the capabilities of the specific database. Advantageously, the end user does not need to be familiar with the limitations and capabilities of the database.

Advantageously, the present invention significantly limits the levels of user training required for custom report generation. Additionally, the present invention eliminates the need for a database administrator (DBA), developer, engineer, or the like to define a secondary schema, model, or catalog which enables the solution to be deployed in a day or less, which is significantly shorter than traditional reporting systems. For example, the present invention can be deployed anywhere with network connectivity. In fact, the present invention does not need to be located with a database, but rather can connect through a network to both the database and various users through standard web browser connections. With the model design process removed, technical personnel are no longer required for report customizations as they can be made directly by the end user.

Generally, the present invention provides a web-based report design interface, i.e. the web-based UI, which is accessed through a standard web browser configured with scripting capabilities. The web-based report design interface includes multiple visual select components that enable a user to select data sources, fields, filters, summary fields, charting elements, descriptions, titles, and other relevant report components to create a custom report without specialized software or database training. The web-based report design interface can include navigational items as our known in the art, such as tables, pages, panels, buttons, drop down lists, hyper links, and the like. Once prepared, the user can preview the custom generated report as well as save it or export it to multiple formats. For example, the custom generated report can include text, tables, graphics, and the like. The web-based report design interface access data in databases, such as a relational database, through virtual or physical network connections.

The web-based report design interface enables the user to select multiple data sources. From each data source, the user can select one or more fields from which the user can filter, reduce, and/or select the data. Additionally, the web-based report design interface supports custom filtering and functions applied to the fields for the purposes of generating a custom report. Advantageously, the present invention enables the custom report generation solely from a standard web browser or the like. This enables the generation of data access language queries or driving a user interface without requiring the creation of additional configuration items like catalogs, models or secondary schemas by a programmer, operator, or database administrator. Thus, business users are afforded a level of freedom and autonomy, and IT staff may be freed to focus on other initiatives.

Referring to FIG. 1, a report system 100 includes visual control components 102, content generators 104, analysis components 106, and database components 108, according to an exemplary embodiment of the present invention. The report system 100 includes software which includes an ordered listing of executable instructions for implementing logical functions associated with the report system 100. For example, the report system 100 can be configured to run on a computer, such as a server, connected to databases 110. The various components 102,104,106,108 are configured to function or execute on the server, a local client, or both. The components 102,104,106,108 can also include counterparts on the server and the client which communicate to each other through events. Additionally, the components 102,104,106, 108 can also communicate with other such components 102, 104,106,108 through events, delegates, direct method calls, indirect method calls, data exchange, or the like.

The visual control components 102 are software components configured to render directly or indirectly to an interactive UI 112, such as a web browser. The interactive UI 112 may be the web-based UI described above providing a user reporting access to the databases 110. The visual control components 102 can include, for example, a field list selector, a filter list selector, a summary field list selector, a chart selector, a data source selector, and the like. These selectors are configured to allow a user to interactively and simply create a customized report through the UI 112 without special software or database programming knowledge. Also, the visual components 102 can automatically pre-select the most likely intended fields, operations, or combinations thereof in a manner that may be overridden by the user. Each combination of fields, operations or combinations thereof can be given points for certain attributes and the combination with the highest score gets automatically selected, i.e. scorecarding. Scorecarding figures out how various fields, operations or combinations thereof are related based on connections in a data source or previous history, and scores results selecting the highest scored results. For example, in the chart selector, scorecarding can auto-select a field such as a date field when a user selects a trend chart. Further, the scorecarding can select a group by month operation for the dates if a user previously has run reports based on grouped months. In another example, scorecarding can be utilized when data sources are joined based on the most likely combination of fields.

The content generators 104 are software components configured to render visual translations, transformations, or visualizations of data to form content 114, such as, for example, charts, grids, tables, and the like. The report system 100 can include multiple content generators 104 for various formats, such as PDF, XLS, DOC, XML, SQL, JPG, GIF, PNG, and the like, and multiple content generators for various types of content, such as table, charts, grids, and the like. The content generators 104 can encapsulate, utilize, or call upon other content generators 104. For example, a PDF document with a chart in it could be rendered by a PDF content generator component that embeds the output of chart content generator which can be further compressed by a graphical file format content generator that generates a graphical format such as GIF, JPG, PNG, or other graphical file format.

The analysis components 106 are configured to analyze, evaluate, connect, translate, transform, or represent relational metadata and data from the databases 110. The analysis components 106 provide a link between the content generation 104 and the database components 108. For example, the analysis components 106 are configured to generally construct the representations in memory 116 for efficient access, modification, transfer, storage, and retrieval. The analysis components 106 are configured to perform real-time analysis on the metadata. The metadata analysis components include various drivers, and a metadata cache. The various drivers act as communication protocols between the components and generators of the report system 100 and the database 110. The drivers utilize techniques specific to each database 110 to each database type, such as Oracle, Microsoft SQL Server, MySQL, DB2, Sybase, and the like, to gather information about what tables, views, fields, and the like are in the database 110.

The database components 108 connect to, transfer data from, and communicate with the databases 110 or other database components. A driver and provider or other abstraction layer can abstract database operations such that the report system 100 can easily connect to multiple types of database servers or data applications as an intermediary layer so that the entire system need not change to support an additional vendor, database type, data source, or data application. Advantageously, this allows the report system 100 to operate with any type of database 110 to generate custom reports without any knowledge of the specific database type or of SQL. The other components 102, 104, 106 in the report system 100 utilize the database components 108 to gather data, metadata, or other relevant data from the source database 110. The visual control components 102 are configured to adapt based on the specific type of database that the database components 108 connect to. Specifically, the UI 112 is configured to only allow characteristics and capabilities associated with the specific database type. Additionally, the analysis components 106 are also configured to operate according to the characteristics and capabilities associated with the specific database type.

For example, different database types can include Oracle, Microsoft SQL Server, MySQL, DB2, Sybase, and the like. Each type of database can include similar field types, such as string, integer, varchar, date, float, etc. However, each database type may allow different operations, i.e. sorting, aggregating, grouping, and filtering, for each field type. The present invention is aware of the nuances associated with each field type for each different database type. For example, one database type may allow numerical operations with string fields while another may not. The awareness of the specific field type for the specific database type enables the report system 100 to provide the same UI 112 for report generation to a user regardless of database type. Advantageously, this enables the user to generate custom reports without intimate database knowledge.

Referring to FIGS. 2-12, an exemplary operation of the report system 100 of FIG. 1 is illustrated through various UI screen examples. The various UI screen examples generally illustrate the process through which the components 102, 104, 106, 108 create a customized report. The UI screens can be displayed through a web browser, and inputs into the screens can be done through user input from, for example, a keyboard, mouse, and the like. The exemplary operation illustrates generation of a business sales report. Those of ordinary skill in the art will recognize the present invention can be utilized to generate any type of custom report from a database. Each of the UI screens includes a tab bar from which a user can select which visual control component to work with. For example, the tab bar can include tabs for reports, data sources, fields, filters, summary, chart, description, style, preview, and the like. Also, the UI screens can include a toolbar with icons, drop down lists, etc. For example, the toolbar can include commands, such as back, new, save, and the like. Finally, the UI screens can include a work area which can include menus, check boxes, drop down lists, and the like associated with each visual control component.

Figure 2:
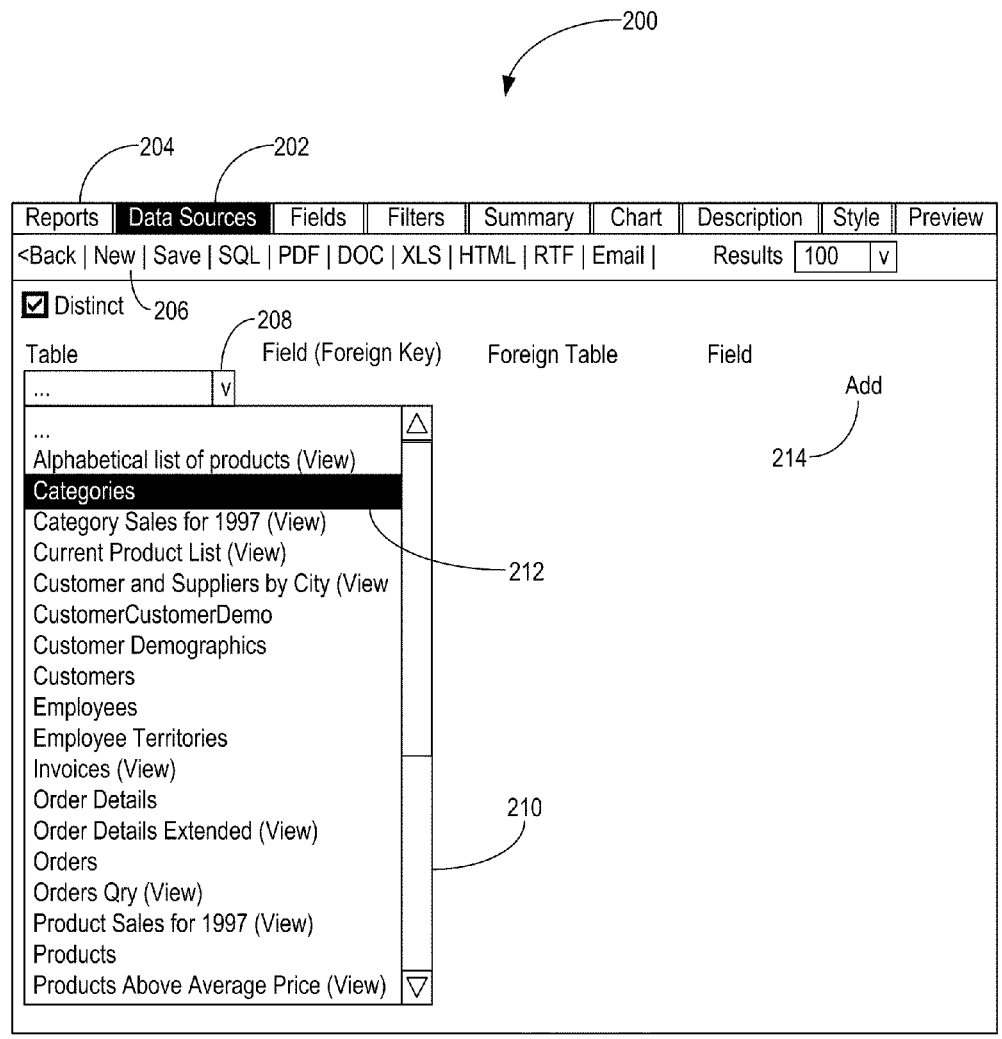
FIG. 2 is a user interface (UI) screen a illustrating a data source tab according to an exemplary embodiment of the present invention.

Referring to FIG. 2, a UI screen 200 is depicted illustrating a data source tab 202 according to an exemplary embodiment of the present invention. A reports tab 204 can provide a screen allowing a user to view all existing reports, save a new report, save an existing report with a new name, and the like. A user can click the "new" icon 206 to start a report design process for a new report. This brings the user to the data source tab 202. A client side data source selector visual component (a web drop-down or combo control in this case) populates by getting a data source list from its server-side counterpart. The server-side counterpart accesses a schema model in a data component which stores the list of available data sources.

Access to data sources can be provided through security credentials, such as a connection string, password, or the like. For example, a user can be provided a connection string which includes information about the database server's name, location, and security credentials, and this automatically adds the data source to the available data sources in the data source list. The connection string is a combination of resource identifiers and security credentials (e.g., password, key, etc.), and the connection string is not the data itself, but rather a pointer to the data similar to a URL. For databases that use a connection string, the connection string is all a user needs to begin accessing various data sources for the purpose of generating custom reports. Of note, data from each of the data sources is streamed and not stored. Specifically, data is accessed from the selected data sources solely for creating the custom report.

Additionally, there is a security layer that hides certain data sources from certain users. The present invention utilizes application level security associated with the database. Here, the present invention is configured to take an existing security model and map this model into the report system. For example, mapping code can be utilized to map the existing security model into the report system. This allows the report system to implement security at multiple levels, such as Records, User, Field, Data Source level security. For example, a CRM management system may allow sales persons to access certain data based on their sales territories. Here, the report system can model the same level of access as the CRM management system, i.e. only allow sales persons to create reports based on their sales territories. Additionally, the present invention can utilize a dynamic security model wherein changes to security levels are incorporated in previously saved reports. Here, the report system checks the current security levels each time a report is accessed, and potentially can prevent a user from utilizing the report if the security levels have changed making a data source unavailable to the user.

The user activates the data source selector visual component by clicking on a table menu 208 which can include a drop down list of various data sources 210. The available data sources 210 are based on databases connected to the report system. Once the database is connected, such as through security credentials, data sources 210 appear in the drop down list. The available data sources 210 are responsive to the security level of the user accessing the report system. Advantageously, the user is not required to add data sources or to have intimate knowledge of the underlying database. The report system itself automatically populates the data sources 210 responsive to the security level of the user.

For example, the various data source 210 include various sales related category in this exemplary operation. The user can select a relevant data source such as categories 212. For example, the user could use the drop down list and select categories 212, and then click on an "add" icon 214. Also, the user could select multiple data sources 210. For example, each time a specific category 212 is added, the user could be presented with another table menu 208 to join more data sources 210. Once selected, the data sources 210 are automatically integrated into the report.

Figure 3:
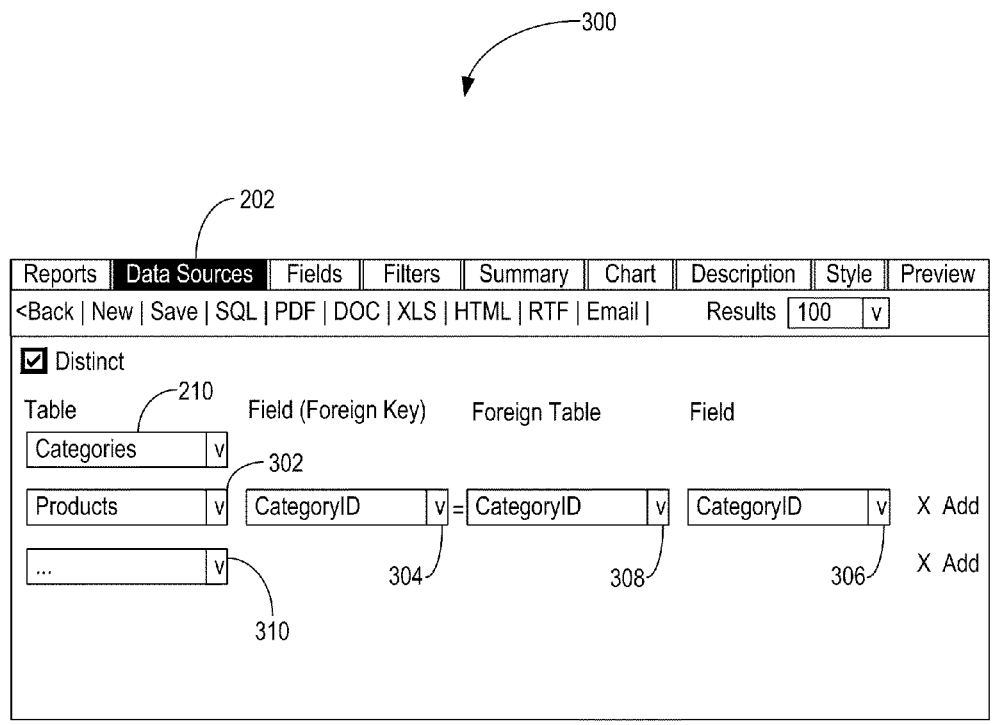
FIG. 3 is a UI screen illustrating a data source tab after selecting two data sources which were automatically joined according to an exemplary embodiment of the present invention.

Referring to FIG. 3, a UI screen 300 is depicted illustrating a data source tab 202 after selecting two data sources 210 according to an exemplary embodiment of the present invention. After the data source 210 is selected, the drop down list can be deactivated. This deactivation allows renders additional visual components 302-310 allowing the user to join additional data sources. For example, this can occur via an AJAX client event. An AJAX client event is essentially triggered by an input device, such as a mouse or keyboard. Special handlers can be set up to respond to events. For example, clicking an item on a drop down can deactivate that control and also trigger a select event that a handler responses to for creation of new controls. Here, the user-selected data sources must be connected with a unique field like a primary or foreign key. For example, an additional visual component could include a "Products" data source 302 with a foreign key selector component 304 and a field selector component 306 auto filled based on scorecarding with appropriate values related to the data source 210. Also, after adding the data source 302, the user could add additional components 310.

It is not required at all for reports to come from a single data source. Joining is basically way to connect the current "set" of data sources 210 to a "single" new one 302. For example, joining five data sources would involve going through this step four times. Joining is a process of adding one more data source to existing data sources such that the new data source 302 has at least one field in common with the existing data sources. For example, the products data source 302 can be added to the categories data source 210 since each data source has a category ID field in common. The foreign key selector component 304, field selector component 306, and foreign table 308 can be auto-filled based on scorecarding, and includes the field in common.

The fields 304,306,308 can be automatically selected for the user. The automatic selection is done by using metadata information in a schema model, an index model, a constraint model, and other potential models. Each combination of fields is scored based on characteristics of the fields. An exact name match or the existence of a constraint or index adds a significant number of points to the score for that combination. A subset match adds a moderate number of points. A small number of points are also added for existence the same character in both fields. Additional mechanisms of point allocation may be utilized for increased accuracy. The combination of fields with the highest score gets automatically selected by the visual component. The user has the option of overriding the automatic field selection. In this example, data in the foreign key selector component 304 and the field selector component 306 is automatically selected as "CategoryID" after completion.

The present invention utilizes a scorecarding algorithm with respect to newly joined data sources. Essentially, previously joined data sources are compared to newly joined data sources being added. Every combination of fields from the previously joined data sources and the newly joined data sources are compared and scored with the highest scored ones selected. For example, the algorithm can give points for certain patterns, such as names of fields matching, similarity, key analysis, existence of constraints and indexes, etc. Further, the algorithm can also analyze existing reports and learn from these. This avoids the requirement of a user manually building a model by selecting a subset of fields and assigning relationships between them.

Figure 4:
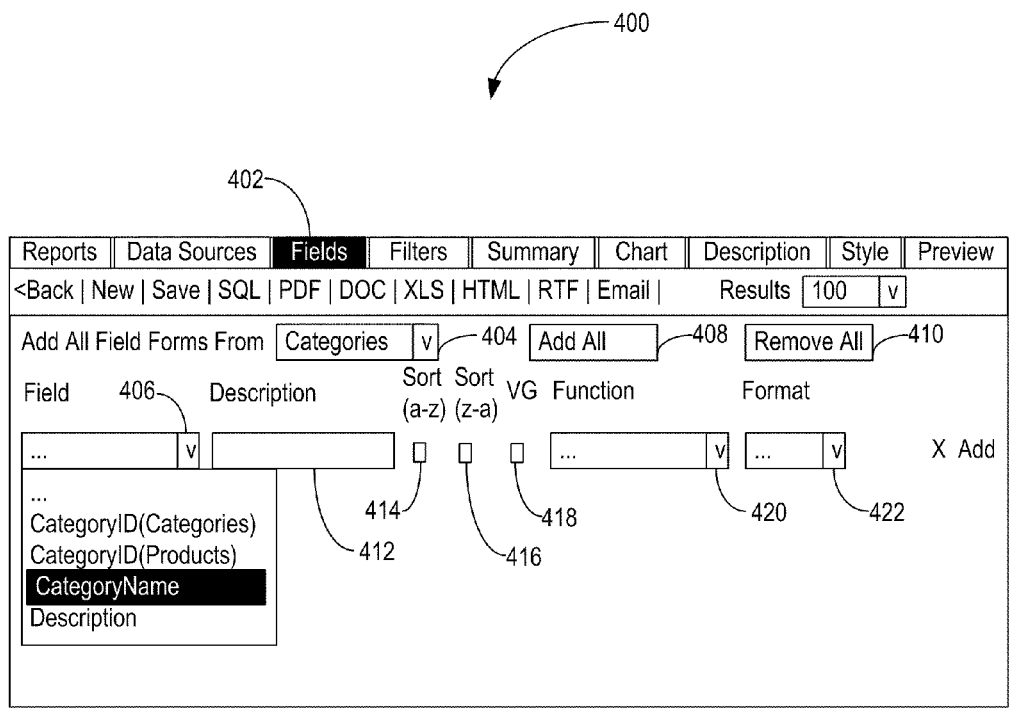
FIG. 4 is a UI screen illustrating a fields tab after selecting data sources in FIGS. 2 and 3 according to an exemplary embodiment of the present invention.

Referring to FIG. 4, a UI screen 400 is depicted illustrating a fields tab 402 after selecting data sources in FIGS. 2 and 3 according to an exemplary embodiment of the present invention. The fields tab 402 enables the user to add and delete fields from selected data sources, sort the fields, perform sorts, and perform functions. The fields tab 402 includes an "add all field forms from" list 404 which enables the user to add all field forms from a specific data source, such as "Categories", from which fields 406 can be added in the fields tab 402. The fields tab 402 can also include an "add all" control 408 and a "remove all" control 410 associated with the list 404. Here, the user can select the controls 408,410 to add or remove all of the field forms in the list 404. The fields 406 is a list of all available fields based specifically on the data sources 202 selected. Once a field is selected in the fields 406, such as Category Name, a default description is populated in a description box 412. The user can override the default description by editing the text in the description box 412. A "Sort(a-z)" check-box 414 sets a state that content generators and an execution engine use to retrieve and/or generate data in alphabetical or numeric order. A "Sort(z-a)" check-box 416 sets a state that the content generators and the execution engine use to retrieve and/or generate data in reverse alphabetical or reverse numeric order.

A "VG" check-box 418 sets a state for the visual grouping ("VG") when selected. When visual grouping is enabled for a field, the content generators render a sub-report heading for that field rather than showing it. This eliminates repeated values showing for categorical data. A function visual selector 420 enables the user to select aggregate functions, such as average, count, count distinct, maximum, minimum, sum, group, and the like. A format visual selector 422 enables the user to select formatting options, such as number formatting, text formatting, and the like. The function and format visual selectors 420,422 (e.g., drop-down lists in this example) are dynamically populated based on the type of data in the field 406 (e.g., date, string, integer, etc). This happens after the user selects the field 406 with the field selector component. The population event gets triggered by the deactivation of the field selector through an event mechanism.

Figure 5:
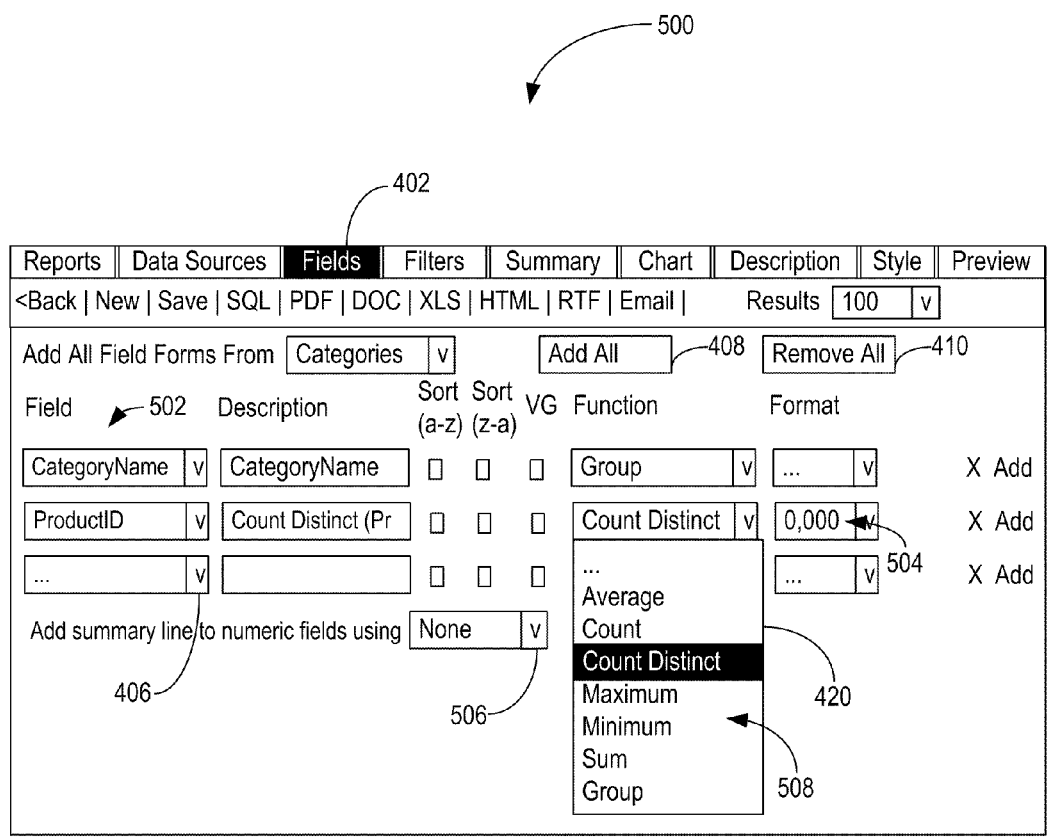
FIG. 5 is a UI screen illustrating the fields tab with the function visual selector and multiple fields according to an exemplary embodiment of the present invention.

Referring to FIG. 5, a UI screen 500 is depicted illustrating the fields tab 402 illustrating the function visual selector 420 and multiple fields 508 according to an exemplary embodiment of the present invention. The function visual selector 420 enables the user to select functions to perform on each field 508. The function visual selector 420 illustrates an example of aggregate functions 502 for numeric field types. A format 504 illustrates an example format of "0,000" for a numeric field type. The aggregate functions 502 include relational functions, i.e. average, maximum, minimum, etc. In addition to the relational functions, the aggregate functions 502 can include a group function. Group relates to the "GROUP BY" operator available in SQL database. Grouping by field 402 buckets the results of non-group calculations by the grouped field. For example, doing a count of a ProductID by CategoryName counts the products in each category separately. A summary line 506 can be added to the report for numeric fields by selecting an aggregate function type in the summary drop-down for the summary line 506.

Figure 6:
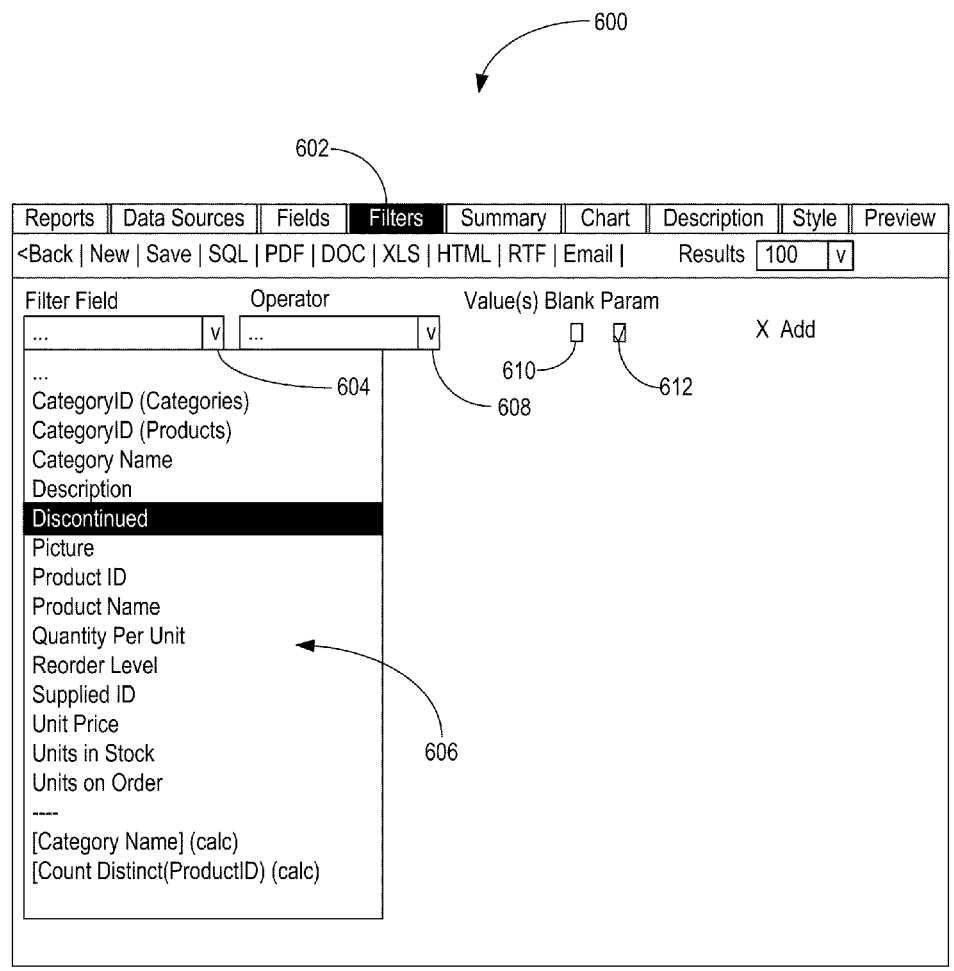
FIG. 6 is a UI screen illustrating a filters tab with a filter field selector according to an exemplary embodiment of the present invention.

Referring to FIG. 6, a UI screen 600 is depicted illustrating a filters tab 602 illustrating a filter field selector 604 according to an exemplary embodiment of the present invention. The filter field selector 604 enables the user to restrict data from each field in the report. Filter visual components 606 relate to the "WHERE" clause in relational databases. The user can select a field to filter by selecting the drop down list in the filter field selector 604. Also, filter operators 608, such as "equals", "is greater than", "doesn't equal", and the like, can be selected by clicking a drop down list of the filter operators 608. The filters tab 602 also can include a "blank" check box 610, and if the "blank" check box 610 is selected, results of the filters tab 602 includes data with blank values. This is necessary for data sources that include data with blank, unknown, invalid, or null values. A parameter ("param") check box 612 allows the user to set the parameter state. When the check box 612 is enabled at the specific filter field selector 604, it should be visual in other places like the preview and allows the report viewer to change the filter when running a report. In other words, the parameter check box 612 enables the filter field selector 604 to be modified by the user who executes the report from a secondary "viewer" component with limited or no report design capabilities.

Figure 7:
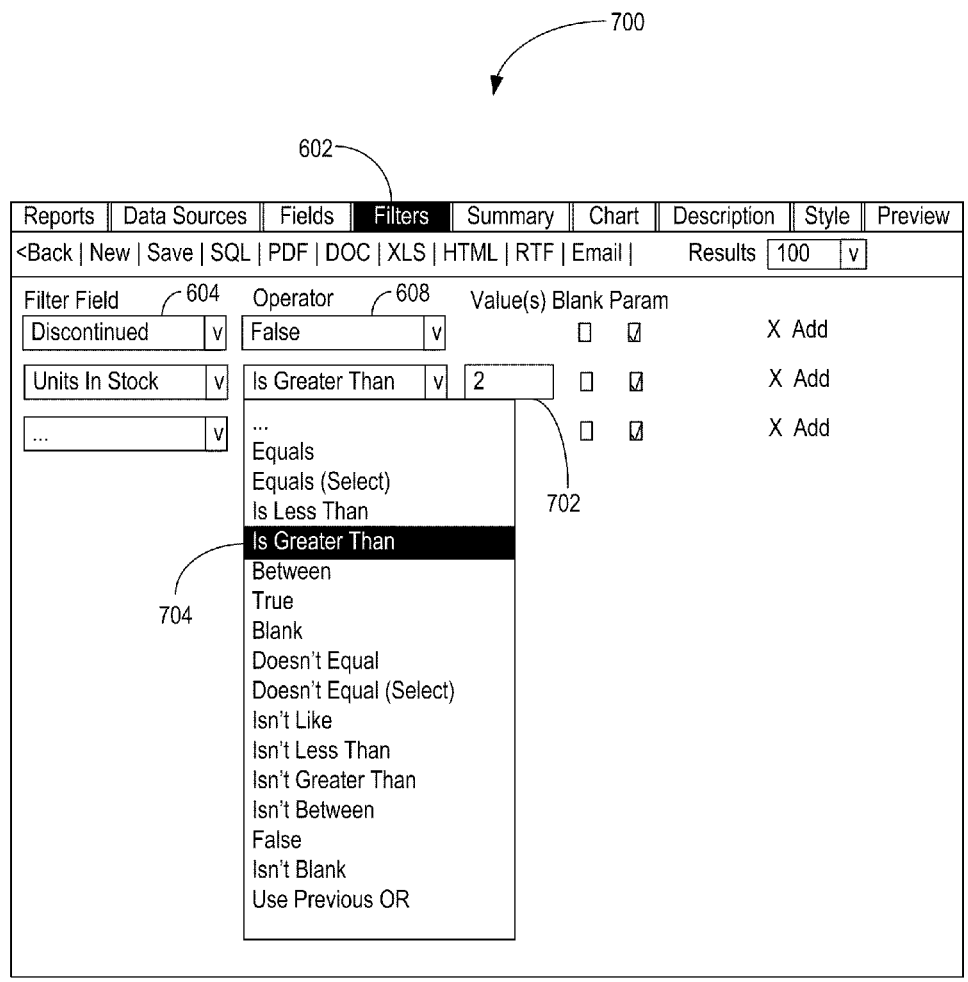
FIG. 7 is a UI screen illustrating the filters tab with exemplary filter fields according to an exemplary embodiment of the present invention.

Referring to FIG. 7, a UI screen 700 is depicted illustrating the filters tab 602 illustrating exemplary filter fields according to an exemplary embodiment of the present invention. The UI screen 700 illustrates a filter field selector 604 of "discontinued" with an operator 608 of "false." Also, the UI screen 700 illustrates a filter field selector 604 of "Units in Stock" with an operator 608 of "is greater than" and a value 702 of "2." A value 702 is shown if applicable for the related operator 608. For example, an operator 608 of "true" or "false" does not require the value 702, but an operator 608 of "is greater than" does. A list 704 illustrates various operators 608, such as "equals", "is less than", "is greater than", etc.

Figure 8:
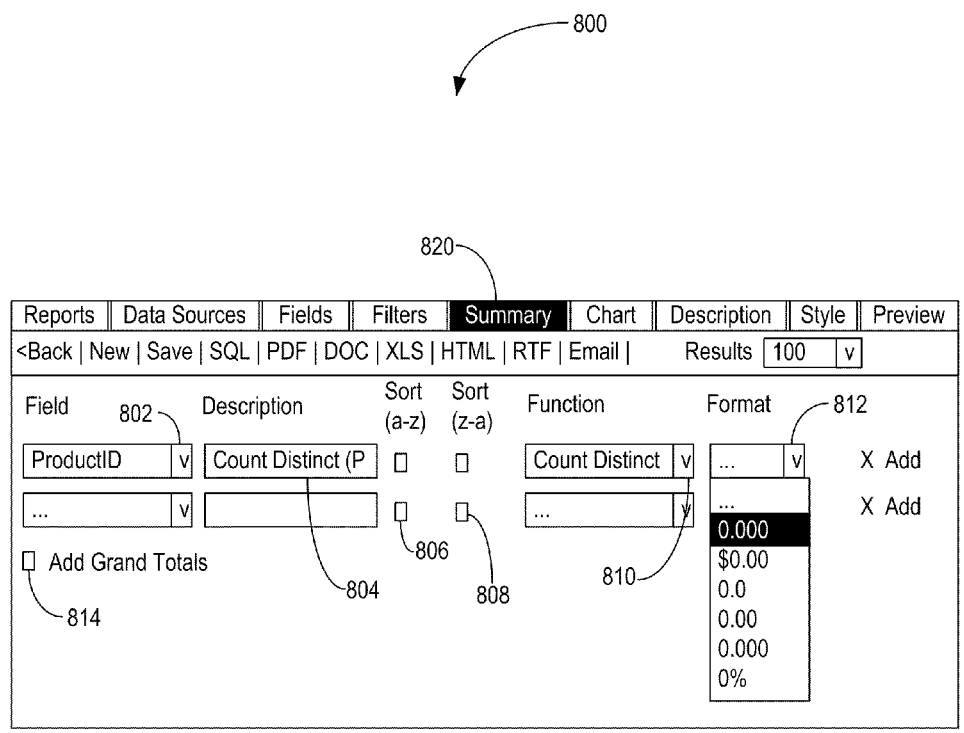
FIG. 8 is a UI screen illustrating a summary tab with a summary of the fields tab according to an exemplary embodiment of the present invention.

Referring to FIG. 8, a UI screen 800 is depicted illustrating a summary tab 820 illustrating a summary of the fields tab 402 according to an exemplary embodiment of the present invention. The summary tab 820 can provide a secondary sub-report intended for aggregate operations. The user selects which fields 802 they want in the summary. For example, the fields 802 can include a drop down list of the fields from the field tab 402. A description 804 gets populated with a generated field name which can be overridden by altering text in a text-box control box. Each field 802 also includes alphabetical and reverse alphabetical check boxes 806,808 as described previously. Also, each field 802 can include function and format categories 810,812 which provide drop down lists of functions and formats. The user can add multiple field 802 lines as needed. A grand totals line 814 can be added to the summary table by selecting a check-box. The grand total feature generates an additional sub-report grid which includes all fields where the function is not a group.

Figure 9:
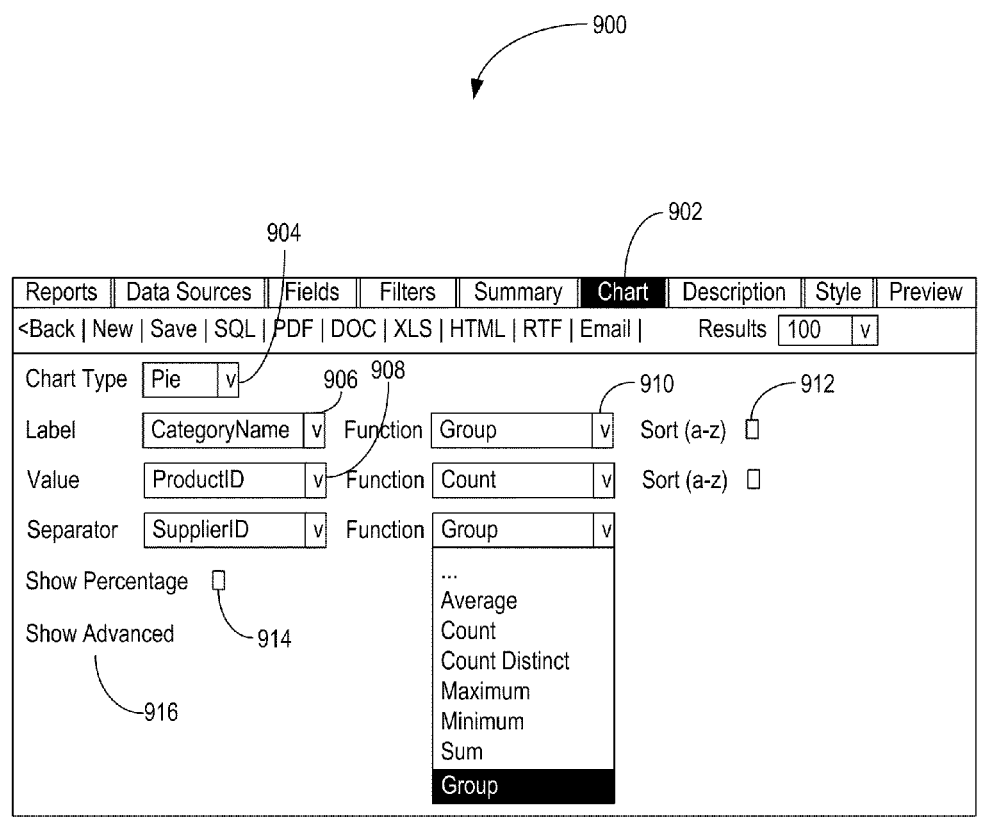
FIG. 9 is a UI screen illustrating a chart tab allowing the user to add a chart to the report according to an exemplary embodiment of the present invention.

Referring to FIG. 9, a UI screen 900 is depicted illustrating a chart tab 902 allowing the user to add a chart to the report according to an exemplary embodiment of the present invention. The chart tab 902 enables the selection of fields for generating a chart, i.e. for the user to add charts to the report. The user can select the type of chart from a chart drop down list 904, such as pie, plot, bar, line, etc. Also, the chart tab 902 displays chart characteristics responsive to the type of chart selected. The user can select which data source is used for labels 906 and the data source for values 908. The aggregate or "Group" function for the label 906 and the value 908 selection is selected in drop down boxed 910 next to each field selection. Sort(a-z) check-boxes 912 set the state which indicate what sorting operations are used. A "Show Percentage" check-box 914 sets state indicating if the chart should show the percentage of total value that each chart element (such as a pie slice) represents in the chart output. Additional graphing options such as 3D charting and other visualizations or effects can be available by clicking an "Advanced" button 916.

Figure 10:
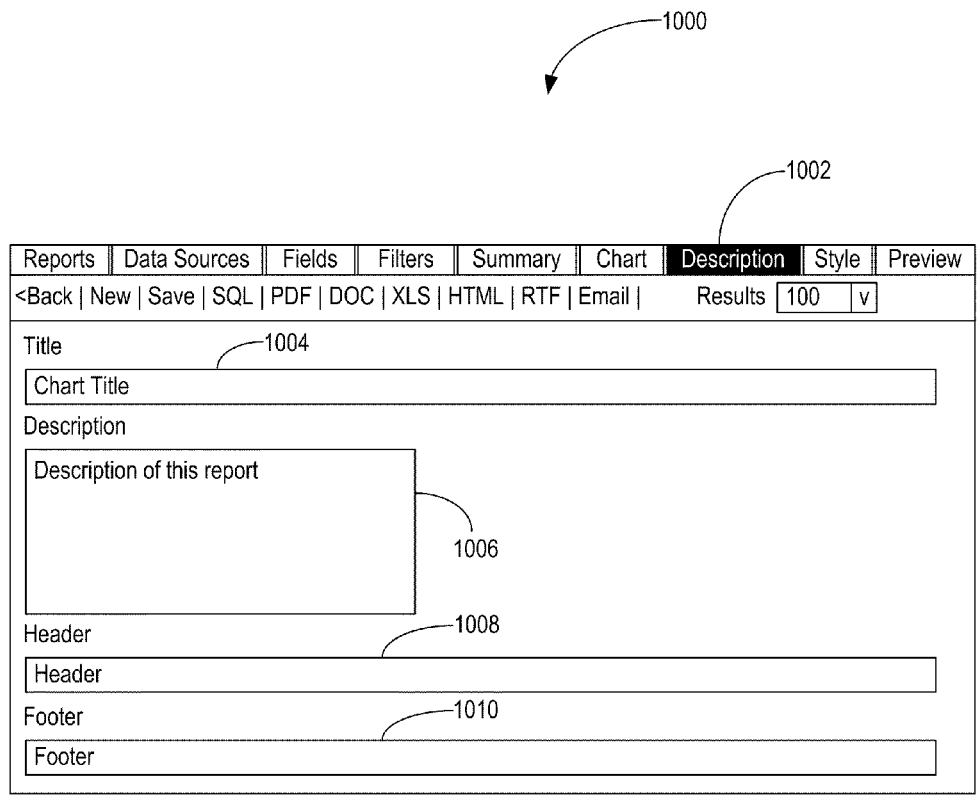
FIG. 10 is a UI screen illustrating a description tab allowing the user to add descriptions to the report according to an exemplary embodiment of the present invention.

Referring to FIG. 10, a UI screen 1000 is depicted illustrating a description tab 1002 allowing the user to add descriptions to the report according to an exemplary embodiment of the present invention. The description tab 1002 gives the user an option to add additional labels to a chart. First, the user can provide a chart title 1004. The user can also provide a brief description 1006 of the report. Also, the user can add a header 1008 and a footer 1010.

Figure 11:
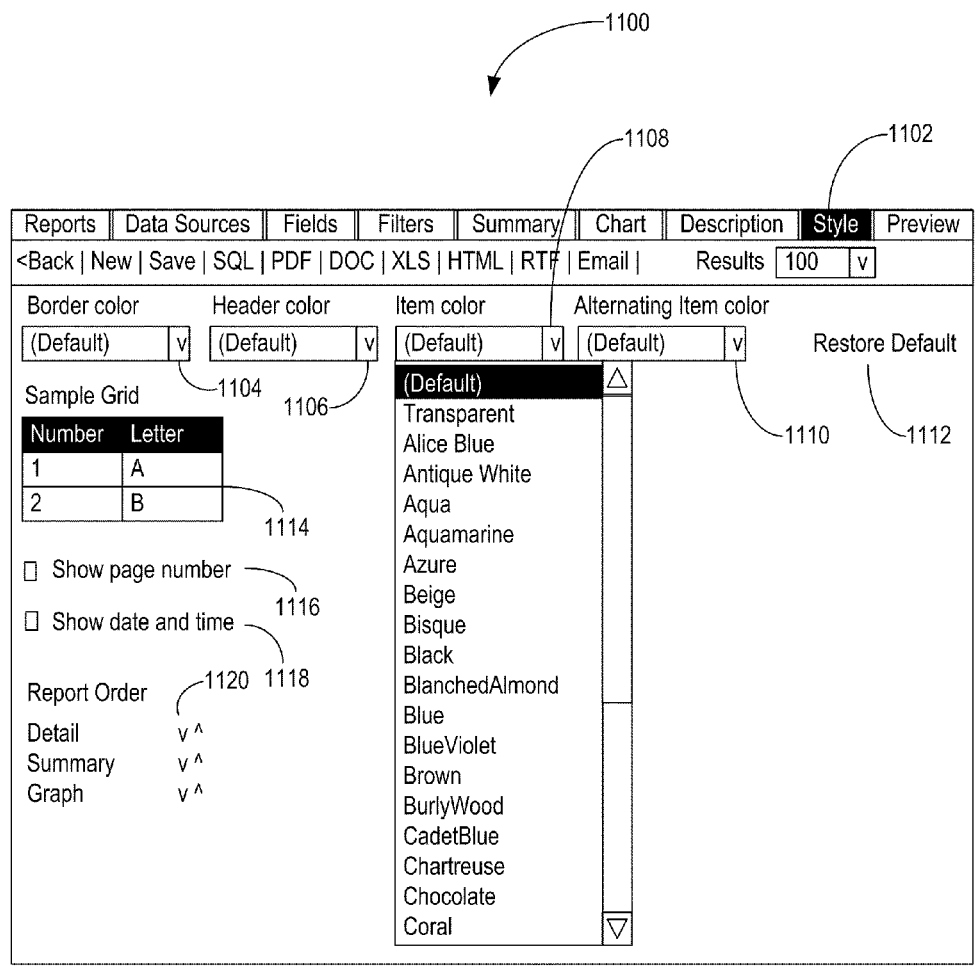
FIG. 11 is a UI screen illustrating a style tab allowing the user to define a report style according to an exemplary embodiment of the present invention.

Referring to FIG. 11, a UI screen 1100 is depicted illustrating a style tab 1102 allowing the user to define a report style according to an exemplary embodiment of the present invention. Here, the user can adjust the style visual component of the report to configure the overall look of the report. For example, the user can select a border color 1104, a header color 1106, an item color 1108, and an alternating item color 1110. These colors 1104,1106,1108,1110 can be selected through a drop down list. Also, the style tab 1102 can include defaults for each item which can be reset by clicking on a restore default tab 1112. The style tab 1102 can include a sample grid 1114 displaying a preview of what the grid looks like based on the user settings. Additional check box options on this tab allow the user to show page number 1116 on the report and/or select to add date and time 1118 to the report by selecting a check-box. Other options allow the user to select layout order 1120 of the layout of the detail table, summary table, and graph in the report.

Figure 12:
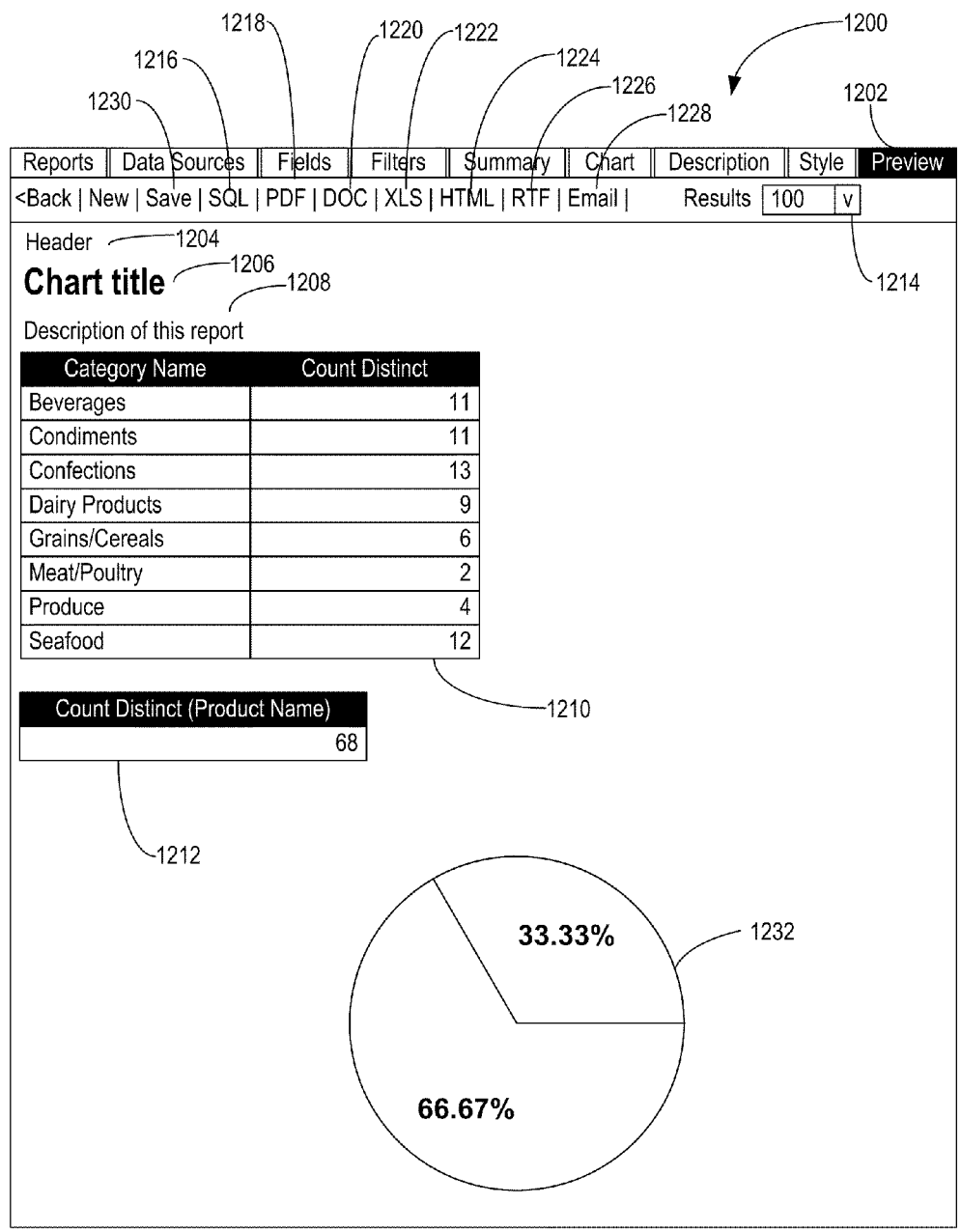
FIG. 12 is a UI screen illustrating a preview tab allowing the user to preview the report according to an exemplary embodiment of the present invention.

Referring to FIG. 12, a UI screen 1200 is depicted illustrating a preview tab 1202 allowing the user to preview the report according to an exemplary embodiment of the present invention. The preview tab 1202 allows the user to see all elements added during the report design process. For example, a header 1204, chart title 1206, and description 1208 are shown from the description tab 1002. A table 1210 illustrates data from the custom report. Here, a table is shown with categories (e.g., beverages, condiments, etc.) and a distinct count (e.g., 11, 11, etc.) with a summary table 1212 showing a grand total. A drop down results lists 1214 can be used to filter the number of shown results (e.g., 100, etc.). A chart 1232 can also appear in the preview tab 1202, as specified in the chart tab 902. The user can save the report by pressing a save button 1230. Also, the user can export the generated report to a variety of formats, such as SQL 1216, PDF 1218, Word 1220, Excel 1222, web page (HTML) 1224, RTF 1226, email 1228, and the like.

Figure 13:
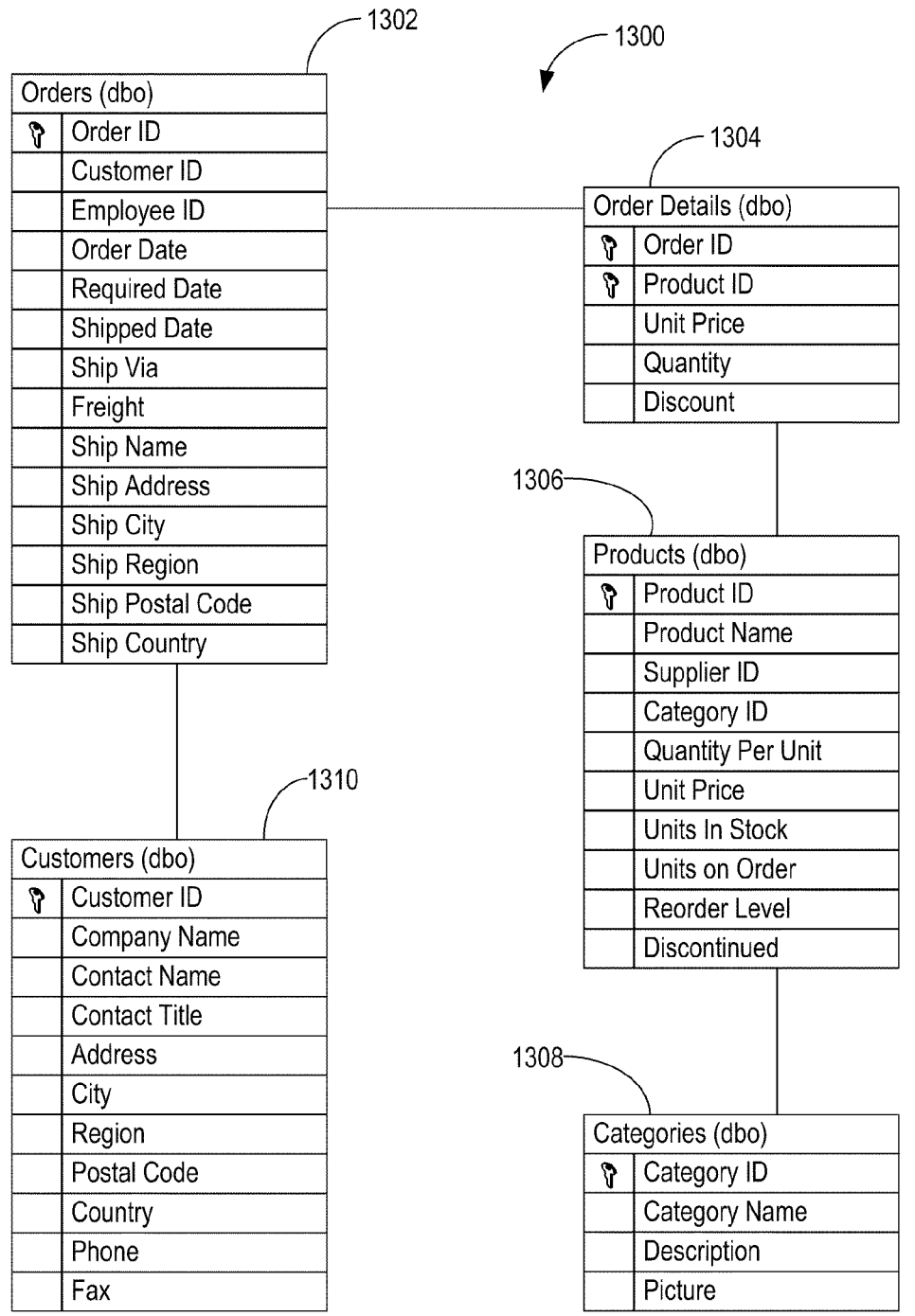
FIG. 13 is a data structure illustrating a sample relational database that is typically included with popular database server applications and can be used to generated custom reports according to an exemplary embodiment of the present invention.

Referring to FIG. 13, a data structure 1300 is depicted illustrating a sample relational database that is typically included with popular database server applications and can be used to generated custom reports according to an exemplary embodiment of the present invention. For example, the data structure 1300 can include database objects (dbo), such as orders 1302, order details 1304, products 1306, categories 1308, and customers 1310. Each of the objects can be keyed to different data entries, e.g. order ID, product ID, category ID, customer ID, etc. The present invention provides a mechanism to generate a custom report of the data structure 1300 through a web-based tool. The web-based tool is easy-to-use, requires no software installation on the client computer, etc. The present invention is configured to execute queries on relational databases, such as in SQL. For example, SQL-92 is a standard, and a query in SQL-92 can include "SELECT", "FROM", "WHERE", "GROUP BY", and "ORDER BY". Each contains specific details on how the query should be executed for specific fields and data sources.

Figure 14:
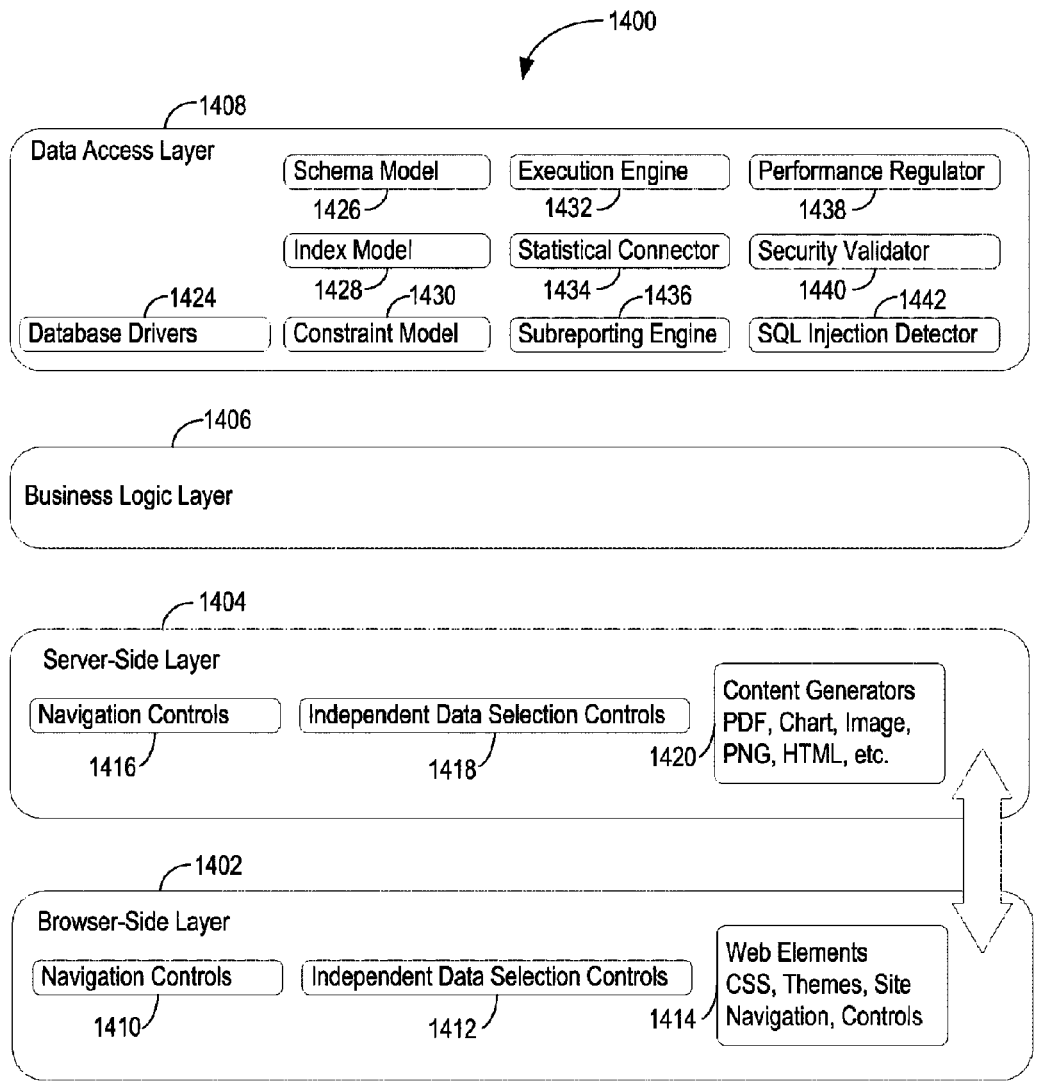
FIG. 14 is a report system representation illustrating general sub-components and modules of the report system according to an exemplary embodiment of the present invention.

Referring to FIG. 14, a report system representation 1400 is depicted illustrating general sub-components and modules of the report system according to an exemplary embodiment of the present invention. The representation 1400 illustrates a way to encapsulate data, business logic, and server and client presentation components of the report system. For example, the representation 1400 can include a browser-side layer 1402, a server-side layer 1404, a business logic layer 1406, and a data access layer 1408. As described herein, the present invention can operate external to a database avoiding custom integration. Additionally, users can access the report system through a standard web browser configured with scripting capabilities. The various layers 1402,1404,1406,1408 are part of a reporting system which can operate on a server. The layers 1402,1404,1406,1408 are configured to provide the functionality between users with web browsing devices and databases for generation of custom reports.

Each component in both the browser-side layer 1402 and the server-side layer 1404 works together with a counterpart. For example, the browser-side layer 1402 includes navigation controls 1410, independent data selection controls 1412, and web elements 1414. The server-side layer 1404 includes navigation controls 1416, independent data selection controls 1418, and content generators 1420. The navigation controls 1410,1416 are configured to control navigation through the report system 1400 on both the user side (i.e., browser) and server side (i.e., report system). For example, the navigation controls 1410,1416 can include the various tabs illustrated in the UI screens of FIGS. 2-12. These controls 1410,1416 maintain the current state of the report system 1400 based on user navigation through the tabs where the state corresponds to the various fields, lists, etc. presented to the user.

The independent data selection controls 1412,1418 provide a mechanism for selection of data, fields, etc. based on selections by the user and auto-selection by the report system 1400. For example, the user can select a data source or the like through a pull down menu. Correspondingly, the report system 1400 can automatically select fields based on scorecarding. The web elements 1414 are configured to utilize buttons, controls, etc. in a UI for the user. The content generators 1420 are configured to provide HTML for the web browser and report output in various binary file formats.

The business logic layer 1406 is configured to coordinate all behaviors between the server-side layer 1404, the browser-side layer 1402, and the data access layer 1408. For example, when a user clicks another tab through the navigation controls 1410, 1416, the business logic layer 1406 coordinates the underlying functions. Additionally, the business logic layer 1406 includes control functions based on rules associated with the report system 1400. For example, upon creation of a new report, a user cannot preview the report if only data sources are selected, but no fields are selected. Here, the business logic layer 1406 acts as a mediator for applying things—e.g. drop-down, a database may not allow an average of string fields.

The data access layer 1408 includes various functions associated with accessing data in a database. Database drivers 1424 are configured to interact with various database types. The drivers 1424 are configured with an intimate understanding of a specific vendor's database including various limitations, capabilities, nuances, and the like associated with the database. The report system 1400 is configured to operate "off-the-shelf" with numerous database types. Advantageously, this allows custom report generation without custom development since the report system 1400 is already configured to interact with the database. For example, the various supporting database vendors can include Oracle, Microsoft SQL Server, MySQL, DB2, Sybase, and the like.

Models 1426,1428,1430 represent in-memory representations of a database state. A schema model 1426 defines tables, fields in each table, and relationships for data sources from the database. The report system 1400 is configured to dynamically and automatically generate the schema model 1426 to provide custom reports. Also, the schema model 1426 does not even need to be stored, but rather it can be generated on the fly as the report is generated. An index model 1428 is similar to the schema model 1426, but focuses on indexes associated with the database. A constraint model 1430 focuses on constraints associated with the database. For example, the constraint model 1430 prevents building relationships, such as relationships prevented by the database itself or by a DBA. The index model 1430 provides additional performance and reliability aspects associated with the report system 1400.

An execution engine 1432 provides back and forth handling of queries and movement of data. A statistical connector 1434 is configured to perform probabilistic analysis associated with the report system 1400. For example, the probabilistic analysis can include the scorecarding algorithm and color highlighting of data (e.g., data in the $90^{th}$ percentile is highlighted). A subreporting engine 1436 is configured to enable look up and embedding of other reports. For example, this can include a pop-up subreport, and the subreporting engine 1436 is configured to handle functions associated with this subreport. A performance regulator 1438 is configured to provide performance regulation. For example, a drop down list may include millions of values, and displaying all values may cause the system 1400 to crash or take a significant amount of time. The performance regulator 1438 is configured to prevent this by providing a fixed number of records or to stop after a predetermined time. A security validator 1440 prevents users from adding fields that they do not have access to. Also, the validator 1440 prevents hackers from building reports, hides reports/information, etc. The security validator 1440 can also change based on a background change to a security model. A SQL injection detector 1442 looks for and prevents malicious activity based on SQL statements, e.g. hackers injecting special marks.

Figure 15:
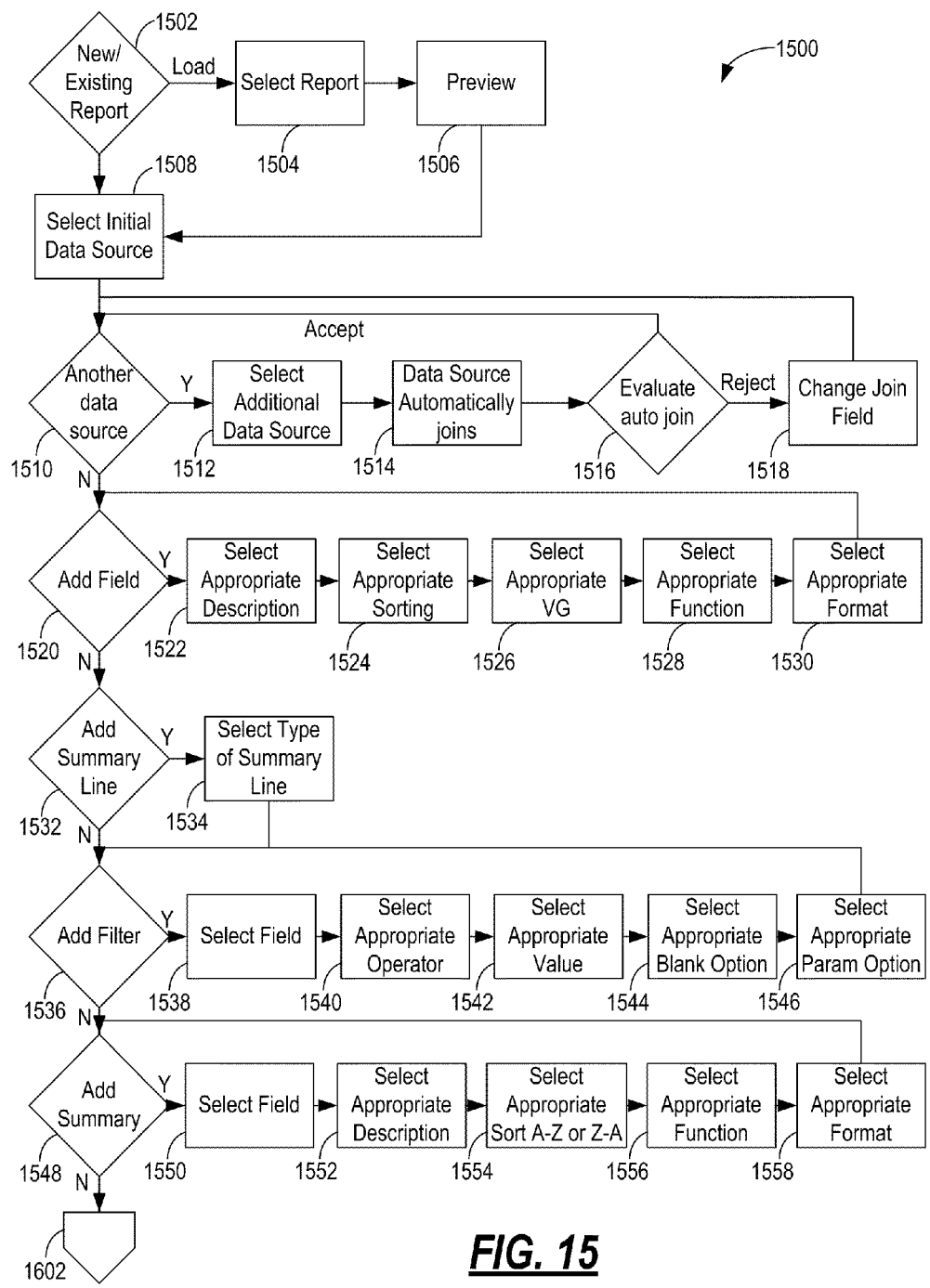
FIGS. 15-17 are flowcharts illustrating an exemplary process of user activity associated with creating a new report according to an exemplary embodiment of the present invention.
Figure 16:
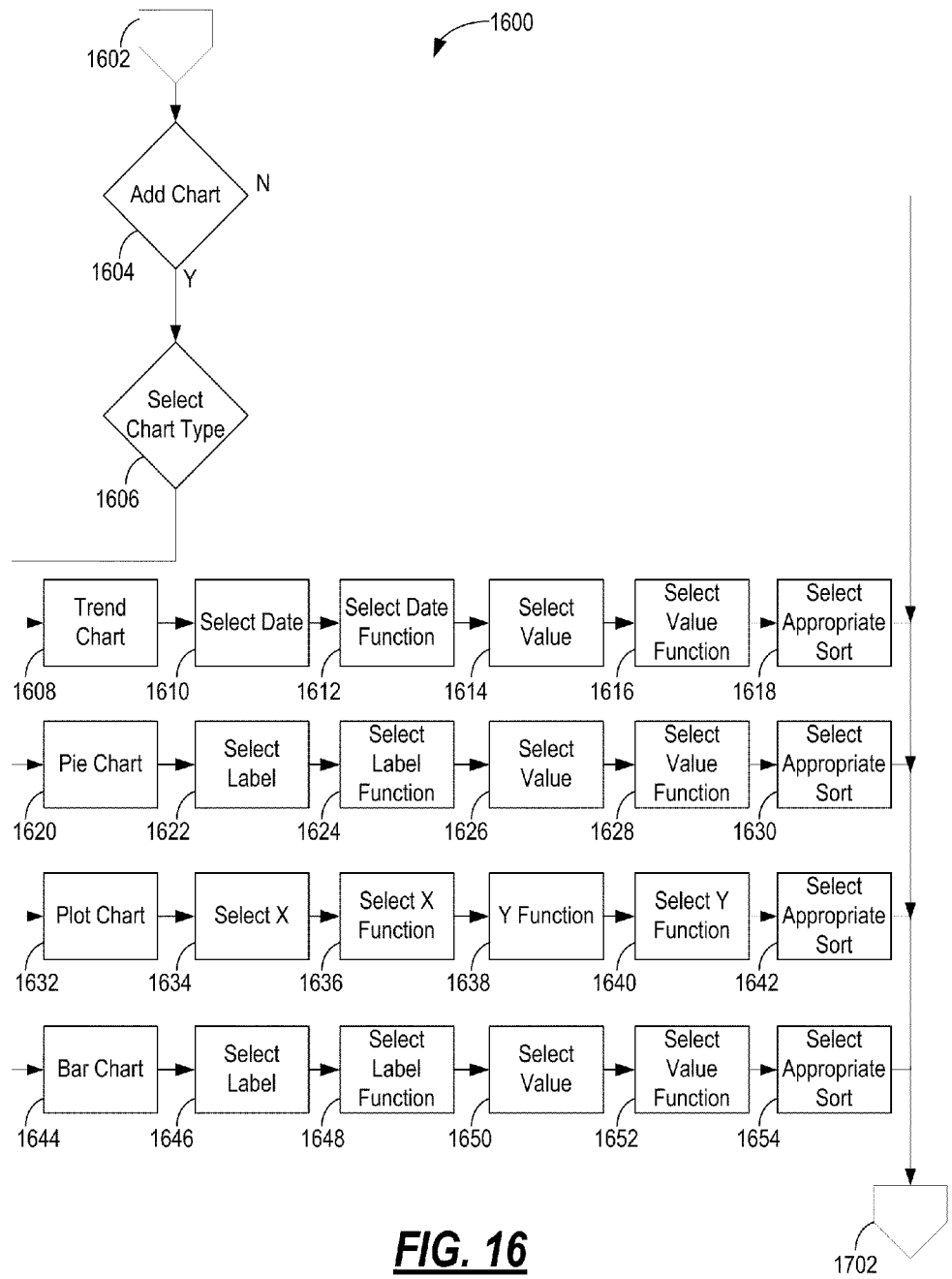
Figure 17:
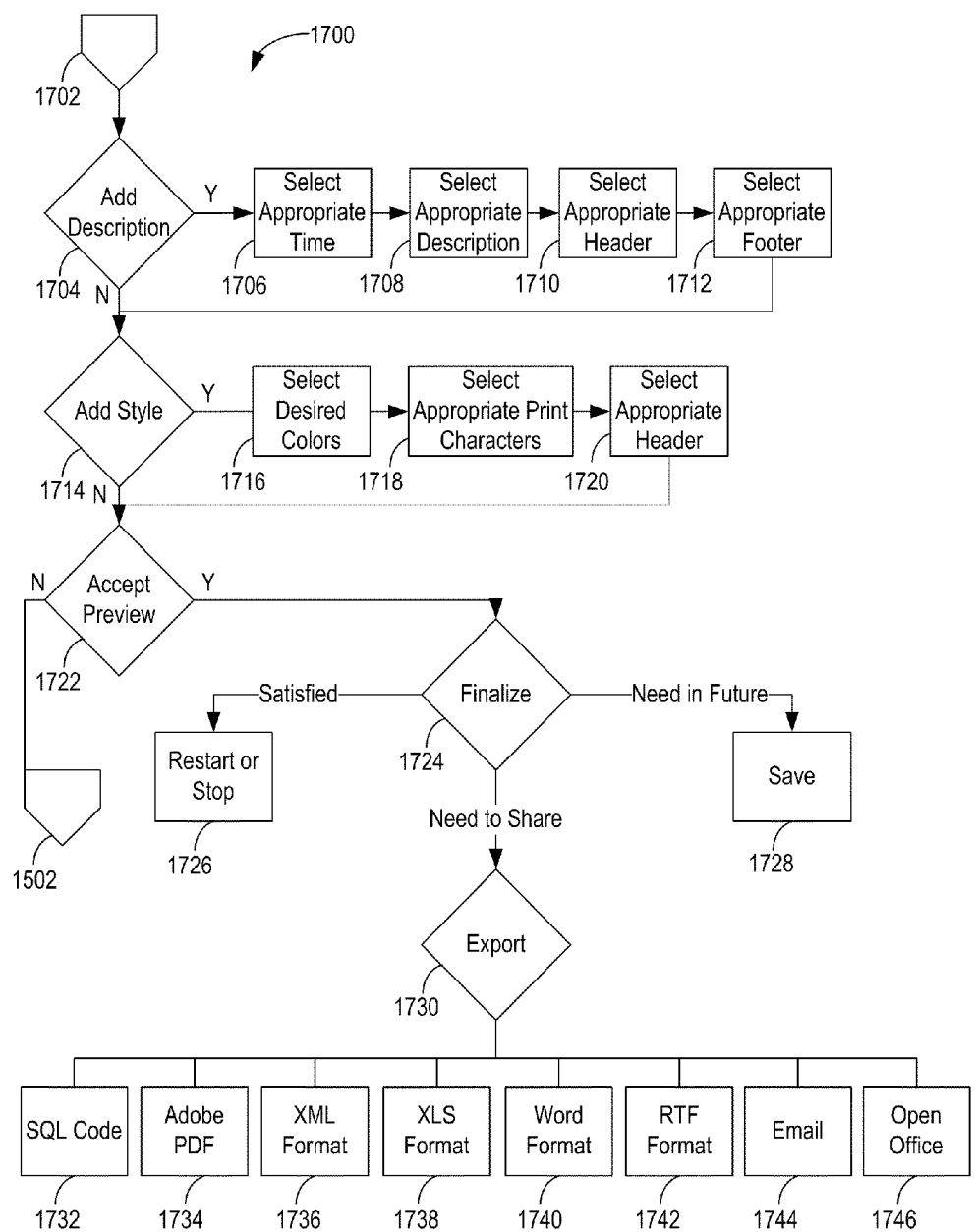

Referring to FIGS. 15-17, flowcharts 1500,1600,1700 illustrate an exemplary process of user activity associated with creating a new report according to an exemplary embodiment of the present invention. Collectively, the flowcharts 1500,1600,1700 show an exemplary operation of a reporting system, such as described herein. A user can log into the reporting system, and begins by selecting a new or existing report (step 1502). If an existing report is selected, the user can select the report (step 1504), such as from a list of available existing reports. Next, the user can preview the selected report (step 1506). If the user selects a new report or after previewing the report, the user selects an initial data source (step 1508). For example, selecting initial data sources can be performed as described herein in FIGS. 2 and 3.

Referring to FIG. 15, after selecting the initial data source, the user optionally can select another data source (step 1510). If the user wants to select another data source, then the user selects the additional data source (step 1512), and the data source automatically joins the report (1514). The user can evaluate the auto join (step 1516). If the user rejects the auto join, the user can change the join field (step 1518), else the user accepts and returns to step 1510 where the user can add yet another data source. If the user does not want to add anymore data sources, the user can determine which fields to add (step 1520). If the user wants to add fields, the user can select an appropriate description (step 1522), select appropriate sorting (step 1524), select appropriate visual sub-grouping (VG) (step 1526), select appropriate function (step 1528), and select appropriate format (step 1530). After adding a field and selecting the various items, the user can decide to add another field (step 1520). If no fields are added, the user can add a summary line (step 1532). The user can select the type of summary line (step 1534). After selecting the type of summary line or if the user does not want a summary line, the user can add a filter (step 1536). Here, a user selects the field to filter (step 1538), the appropriate filter operator (step 1540), the appropriate value for the operator if applicable (step 1542), the appropriate blank option (to return null values) (step 1544), and the appropriate parameter option (to allow the user to modify the parameter from the report viewer) (step 1546). After selecting the filter options, the user can add another filter (step 1536), or add a summary (step 1548). To add the summary, the user selects the field (step 1550), selects the appropriate description (step 1552), selects the appropriate sorting, i.e. A-Z or Z-A (step 1554), selects the appropriate function (step 1556), and selects the appropriate format (step 1558). After adding the summary, the user can add another summary (step 1548), or move to step 1602.

Referring to FIG. 16, after step 1602, the user can add a chart to the report (step 1604). If the user does not want to add a chart, the user proceeds to step 1702. If the user adds a chart, the user selects the chart type (step 1606). For example, the chart type can include trend, pie, plot, bar, etc. If the chart type is a trend chart (step 1608), the user selects a date (step 1610), selects a date function (step 1612), selects a value (step 1614), selects a value function (step 1616), and selects the appropriate sort (step 1618), and then proceeds to step 1702. If the chart is a pie chart (step 1620), the user selects a label (step 1622), selects a label function (step 1624), selects a value (step 1626), selects a value function (step 1628), and selects the appropriate sort (step 1630), and then proceeds to step 1702. If the chart is a plot chart (step 1632), the user selects the x-axis (step 1634), selects the function for the x-axis (step 1636), selects the y-axis (step 1638), selects the function for the y-axis (step 1640), and selects the appropriate sort (step 1642), and then proceeds to step 1702. In the chart is a bar chart (step 1644), the user selects a label (step 1646), selects a label function (step 1648), selects a value (step 1650), selects a value function (step 1652), and selects the appropriate sort (step 1654), and then proceeds to step 1702.

Referring to FIG. 17, after step 1702, the user can add a description (step 1704). If the user adds a description, the user selects the appropriate time (step 1706), selects the appropriate description (step 1708), selects the appropriate header (step 1710), and selects the appropriate footer (step 1712). After selecting the various components of the description or if no description is required, the user can add style (step 1714). To add style, the user selects the desired colors (step 1716), selects the appropriate print characters (step 1718), and selects the appropriate header (step 1720). After adding the various style components or if no style is added, the user can review a preview of the report. Here, the user can accept the preview (step 1722). If the user declines the report, the user can go back to step 1502 or an intervening step to change various components of the report.

If the preview is accepted, the user is ready to finalize the report (step 1724). If the user is satisfied and the report is not needed in the future or to share, the user can restart or stop (step 1726). If the user needs the report in the future, the user can save the report (step 1728). If the user needs to share the report, the user can select an export mechanism (step 1730). For example, the report can be exported to a variety of formats, such as SQL code (step 1732), Adobe PDF (step 1734), XML format (step 1736), XLS format (step 1738), Word format (step 1740), Rich Text Format (RTF) (step 1742), email (step 1744), Open Office (step 1746), and the like.

Figure 18:
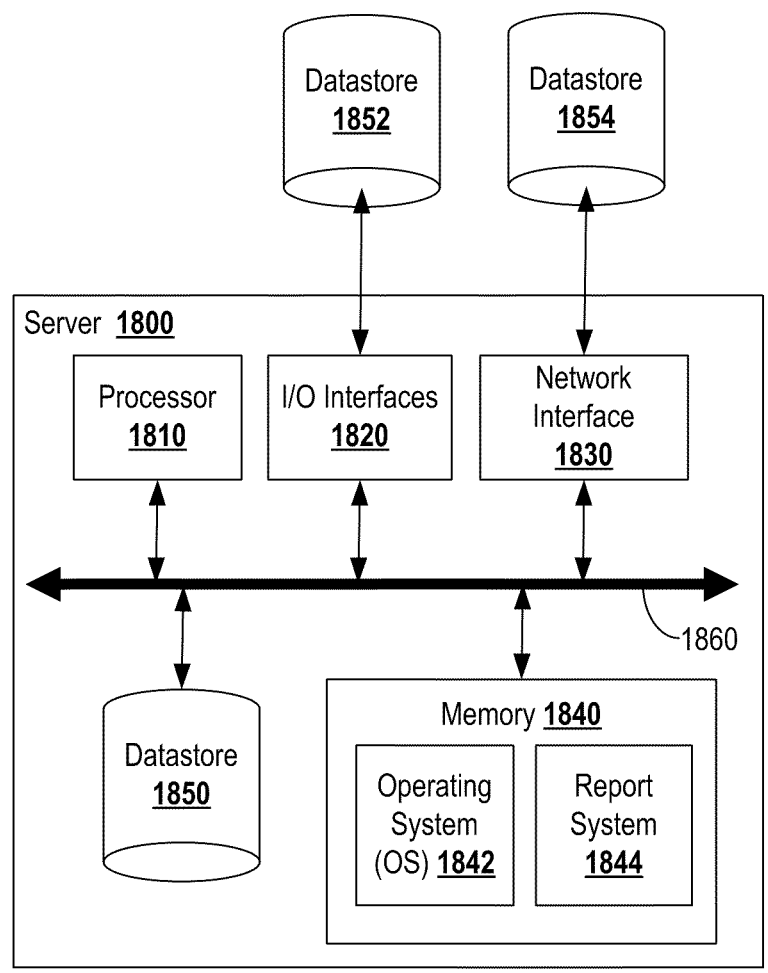
FIG. 18 is a block diagram illustrating a server having a report system according to an exemplary embodiment of the present invention.

Referring to FIG. 18, a block diagram illustrates a server 1800 having a report generation system 1844, according to an exemplary embodiment of the present invention. The server 1800 can be a digital computer that, in terms of hardware architecture, generally includes a processor 1810, input/output (I/O) interfaces 1820, network interfaces 1830, memory 1840, and a data store 1850. The components 1810, 1820, 1830, 1840, 1850 are communicatively coupled via a local interface 1860. The local interface 1860 can be, for example but not limited to, one or more buses or other wired or wireless connections, as is known in the art. The local interface 1860 can have additional elements, which are omitted for simplicity, such as controllers, buffers (caches), drivers, repeaters, and receivers, among many others, to enable communications. Further, the local interface 1860 can include address, control, and/or data connections to enable appropriate communications among the aforementioned components.

The processor 1810 is a hardware device for executing software instructions. The processor 1810 can be any custom made or commercially available processor, a central processing unit (CPU), an auxiliary processor among several processors associated with the server 1800, a semiconductor-based microprocessor (in the form of a microchip or chip set), or generally any device for executing software instructions. When the server 1800 is in operation, the processor 1810 is configured to execute software stored within the memory 1840, to communicate data to and from the memory 1840, and to generally control operations of the server 1800 pursuant to the software instructions.

The I/O interfaces 1820 can be used to receive user input from and/or for providing system output to one or more devices or components. User input can be provided via, for example, a keyboard and/or a mouse. System output can be provided via a display device and a printer (not shown). I/O interfaces 1820 can include, for example, a serial port, a parallel port, a small computer system interface (SCSI), an infrared (IR) interface, a radio frequency (RF) interface, and/or a universal serial bus (USB) interface. The network interfaces 1830 can be used to enable the server 1800 to communicate on a network, e.g. the Internet, a local area network (LAN), etc. The network interfaces 1830 can include, for example, an Ethernet card (e.g., 10BaseT, Fast Ethernet, Gigabit Ethernet) or a wireless local area network (WLAN) card (e.g., 802.11a/b/g). The network interfaces 1830 can include address, control, and/or data connections to enable appropriate communications on the network. The network interfaces 1830 are configured to enable multiple client devices to access the server 1830 to perform report generation with the report generation system 1844.

The data store 1850 can be used to store data that the server 1800 receives or analyzes to form reports. In one example, the data store 1850 can be located internal to the server 1800 such as, for example, an internal hard drive connected to the local interface 1860 in the server 1800. Additionally in another embodiment, a data store 1852 can be located external to the server 1800 such as, for example, an external hard drive connected to the I/O interfaces 1820 (e.g., SCSI or USB connection). Finally in yet another embodiment, a data store 1854 can be connected to the server 1800 through a network, such as, for example, a network attached file server. The data store 1850, 1852, 1854 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the data store 1850, 1852, 1854 may incorporate electronic, magnetic, optical, and/or other types of storage media.

The memory 1840 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 1840 may incorporate electronic, magnetic, optical, and/or other types of storage media. Note that the memory 1840 can have a distributed architecture, where various components are situated remotely from one another, but can be accessed by the processor 1810. The software in memory 1840 can include one or more software programs, each of which includes an ordered listing of executable instructions for implementing logical functions. In the example of FIG. 18, the software in the memory system 1840 includes the report system 1844 and a suitable operating system (O/S) 1842. The operating system 1842 essentially controls the execution of other computer programs, such as the report system 1844, and provides scheduling, input-output control, file and data management, memory management, and communication control and related services. For example, the operating system 1842 can be any of Windows NT, Windows 2000, Windows XP, Windows Vista (all available from Microsoft, Corp. of Redmond, Wash.), Solaris (available from Sun Microsystems, Inc. of Palo Alto, Calif.), LINUX (or another UNIX variant) (such as available from RedHat of Raleigh, N.C.), or the like.

The report generation system 1844 can include software instructions operable to enable clients to generate custom reports through a web-based interface (i.e., through the network interface 1830). For example, the report generation system 1844 can be configured to perform the embodiments described herein. The system 1844 can connect to databases in the datastore 1850,1852,1854 or through the network interface 1830. For example, the databases can include Oracle, Microsoft SQL Server, MySQL, DB2, Sybase, or the like. The report generation system 1844 allows clients to quickly add data sources, fields, filters, grids, graphs and gauges to their reports using data from any database. Accordingly, custom reports can be generated in minutes by any user, removing the conventional requirements for a database programmer to develop a custom model to build reports.

Advantageously, the report generation system 1844 enables simple report customizations, such as adding a new field, to take minutes from a web browser anywhere in the world. Additionally, the report generation system 1844 can be integrated with existing database software quickly. The report generation system 1844 integrates directly into existing web applications. It inherits an application's existing security model, appearance and navigation, providing total integration. Also, the system 1844 includes extensive application program index (API) which enables developers to custom-tailor the tool to fit specific needs so it does not feel like a "bolted on" reporting system. For example, the report generation system 1844 can be added to a standard application on a per customer basis, with no need to alter a product's code base, project assets and core documentation. In an exemplary embodiment, the report generation system 1844 can utilize the .NET environment and can be integrated into a .NET application. Advantageously, this allows a rapid deployment of the system 1844.

Figure 19:
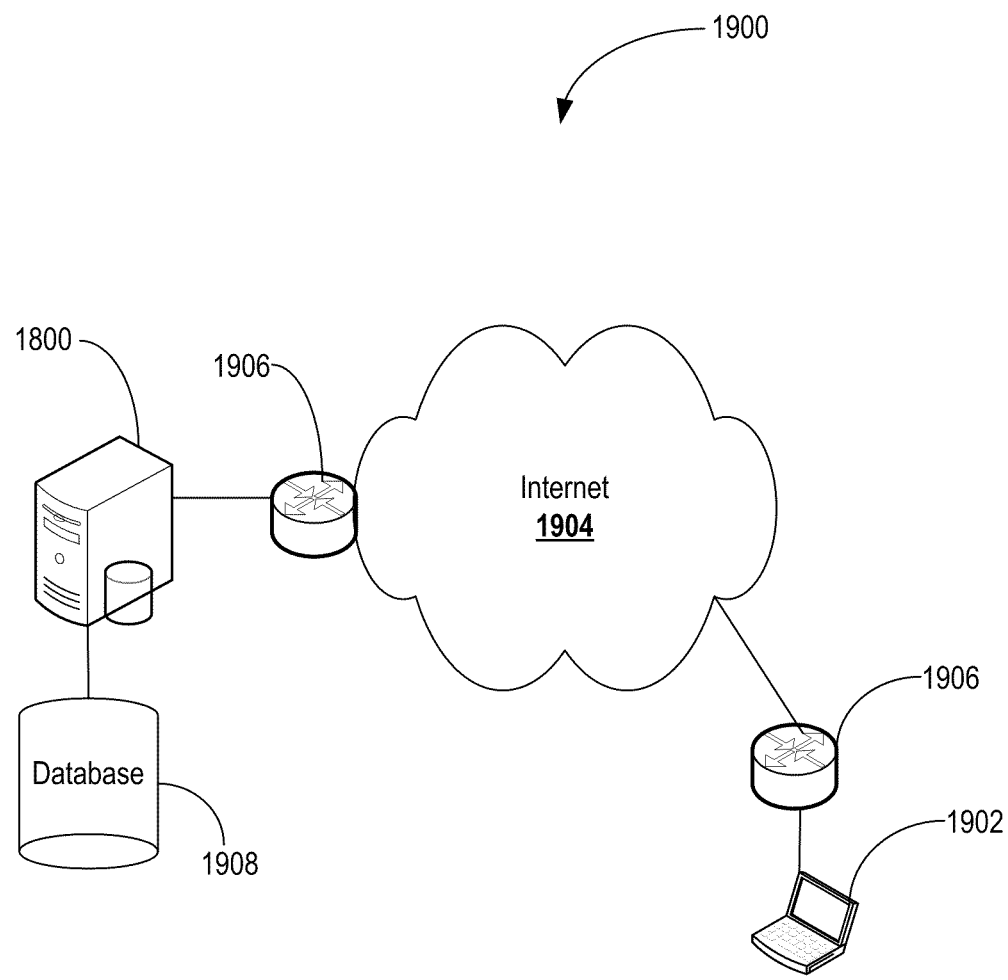
FIG. 19 is a network diagram illustrating a user accessing the server of FIG. 18 to perform custom report generation according to an exemplary embodiment of the present invention.

Referring to FIG. 19, a network 1900 is depicted illustrating a client 1902 connected to a server 1800 through the Internet 1904 according to an exemplary embodiment of the present invention. For example, the client 1902 can connect to a router/switch 1904 in a local area network (LAN) which connects to the Internet 1904. The server 1800 can also connect to a router/switch 1906 which connects to the Internet 1904. The client 1902 can include a laptop, a desktop, and the like operating a web browser, such as Internet Explorer (available from Microsoft Corp.), Netscape (available from Netscape Communications), FireFox (available from Mozilla), Opera (available from Opera Software), Safari (available from Apple, Inc.), and the like, and an operating system such as Windows, Linux, Mac OS, and the like. Also, the web browser does not require any special configuration or plug-in software, and the client 1902 can access the reporting system 1844 through the web browser without any other software required on the client 1902. Additionally, a firewall (not shown) may be included protecting access to the Internet 1904. The server 1800 is configured to operate through a firewall.

The server 1800 is configured to communicate with one or more databases 1908. For example, the databases can include Oracle, Microsoft SQL Server, MySQL, DB2, Sybase and the like. In one exemplary embodiment, the database 1908 can physically be collocated with the server 1800, and even part of the same computer system. In another exemplary embodiment, the database 1908 can be remotely connected to the server 1800 such as over the Internet 1904 or through a VPN. Here, the present invention further contemplates using the server 1800 to generate reports off Internet-based databases 1908, i.e. the server 1800 is configured to connect to the database 1908 over a network connection even over extended distances. The server 1800 is configured to utilize existing mechanisms to connect to the database 1908. These mechanisms can include special protocols for each different database type.

A user can utilize the client 1902 to securely log into the server 1800 over the Internet 1904 and design custom reports through the reporting system 1844. For example, the user can have security credentials to log into the server 1800. For the database 1908, the user can have a connection string or password which provides both an address and security credentials for the database 1908. Once the credentials are supplied, the reporting system 1844 is configured to automatically provide data sources to the user and the associated UI screens for creating a custom report based on the type of the database 1908.

Interactions between the client 1902 and server 1800 can include client side scripting which eliminates most page refreshes. Here, the client 1902 includes a web browser which supports client side scripting capabilities, such as AJAX. The client 1902 and the server 1800 can communicate utilizing the hyper text transfer protocol (HTTP) or HTTPS. Accordingly, the reporting system 1844 utilizes a scripted browser environment, and not a desktop client. This allows rapid deployment of the system 1844 since no clients are installed on a user's computer. Advantageously, the use of HTTP allows any browser with scripting to be configured to connect to the server 1800 without special security configurations.

Figure 20:
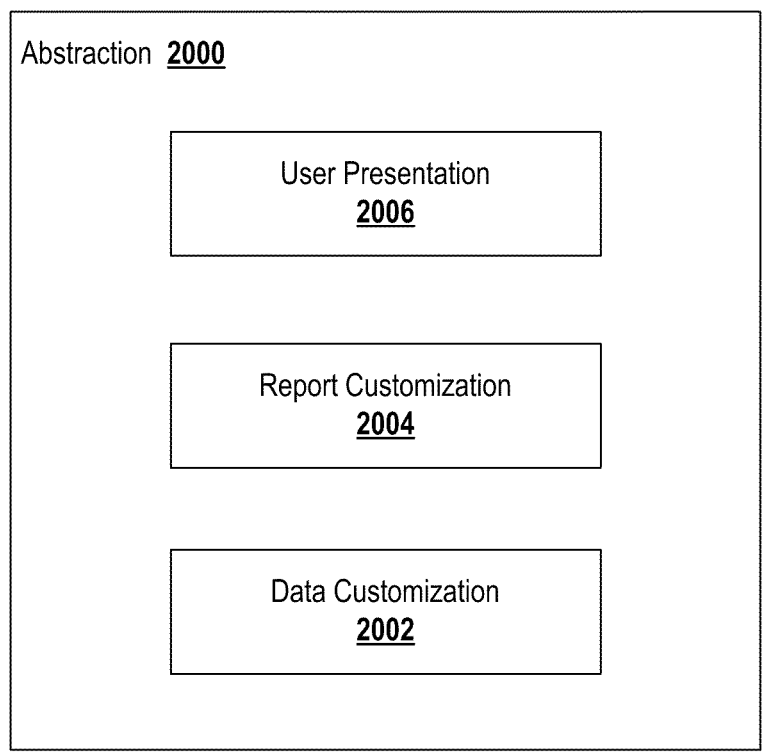
FIG. 20 is a diagram of an abstraction of various levels associated with a reporting system according to an exemplary embodiment of the present invention.

Referring to FIG. 20, an abstraction 2000 is illustrated of various levels 2002,2004,2006 associated with a reporting system according to an exemplary embodiment of the present invention. In a first level, the reporting system performs data customization 2002 which includes various filters and criteria associated with data customization. Here, data is customized based on various operations. Next, the reporting system includes a report customization level 2004. Here, the reporting system allows actual customization of the report itself. For example, different fields, groupings, sortings, and the like can be implemented. Advantageously, the present invention performs this over HTTP/HTTPS and requires no knowledge of SQL or of characteristics and capabilities of the specific database type. Instead, the reporting system itself is aware of the characteristics and capabilities and presents a user an easy-to-use UI in lieu of SQL commands. This enables end users to perform report customization without intimate database knowledge. In a third level of abstraction, a user presentation level 2006 provides an adaptable UI for report customization based on the specific type of database used. Here, the UI enables valid custom reports by only showing users report options within capabilities of the specific database type. Further, the UI provides warnings or automatic corrections based on invalid combinations.

Figure 21:
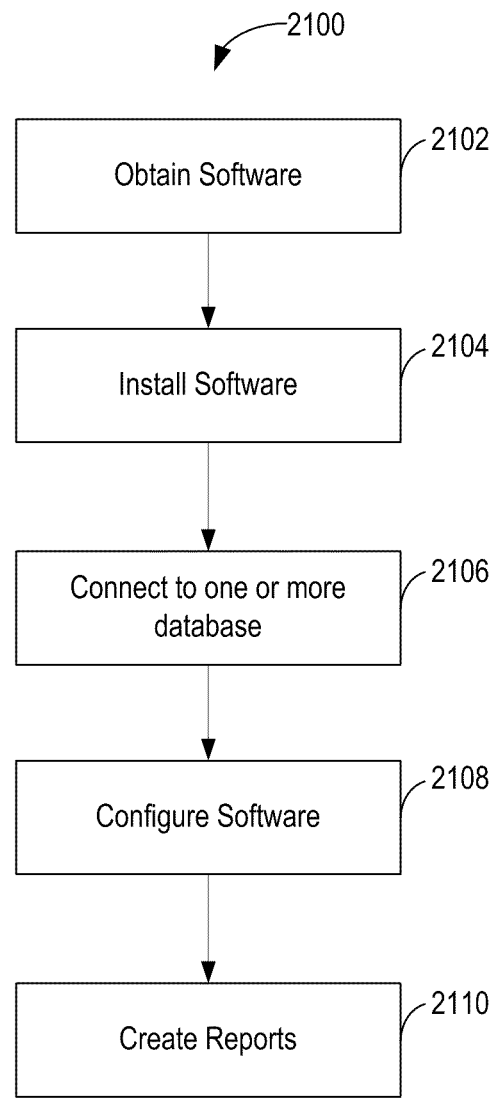
FIG. 21 is a flowchart of a method for installing and setting up a reporting system according to an exemplary embodiment of the present invention.

Referring to FIG. 21, a flowchart is illustrated for a method 2100 of installing and setting up a reporting system according to an exemplary embodiment of the present invention. The exemplary method 2100 may be implemented with the network 1900, the client 1902, and the server 1800 as depicted in FIGS. 18 and 19. As described herein, software with respect to the method 2100 includes software configured to execute the systems and methods described herein with respect to the present invention. First, a copy of the software is obtained (step 2102). The software may be obtained via physical media or downloaded from a network. Furthermore, the software may be configured to operate on a specific database type (e.g., SQL Server 2000 or 2005, Oracle v9 and above, MySQL, IBM DB2, and the like) and on a specific operating system 1842 of the server 1800. A license key may also be provided with the software. The software is installed on the server 1800 (step 2104). As described herein, the software and the present invention provide an integrated platform for browser-based report customization and works, and the server 1800 may be an existing application's web server or another web server. In an exemplary embodiment, the software may be installed on a Microsoft Internet Information Server/Services (IIS). The IIS may be part or an add-on to Windows NT 3.5, 4.0, Windows 2000, Windows XP, Windows Server 2003, 2008, and the like. In a particular exemplary embodiment, the software may be installed on IIS ver. 5.1 or higher, Microsoft .NET framework 1.1 or higher, and the like. Furthermore, there may be different versions of the software using C# or VB.NET (Visual Basic .NET) in case any code integration is needed with the software. In a particular exemplary embodiment, the software may be distributed with different installations for various versions of .NET and for C# and VB.NET with the user deciding which installation is appropriate.

Once the software is installed, the software connects to one or more databases (step 2106). As discussed above, the software may support one or more different database types such as SQL Server 2000 or 2005, Oracle v9 and above, MySQL, IBM DB2, and the like. At this step or prior to, a connection string is required that has proper read permissions to both data and metadata in the database. The connection string is a string that specifies information about a data source and the method of connecting to it. It is passed in code to an underlying driver or provider in order to initiate the connection. The connection string may include attributes such as the name of the driver, server and database, as well as security information such as user name and password. Furthermore, the connection string may include a network address (e.g., IP address) or the like for external connections such as shown in FIG. 19. The software is configured to connect to an up and running database based on the connection string. An example connection string for SQL Server 2000, 2005 may be "Server=myAddress;Database=mydb;User ID=myUsername;Password=myPassword;" for a local database and "Server=myServerAddress;Database=myDataBase;Trusted Connection=True;" for a remote database. Another example connection string for Oracle may be "Provider=msdaora;DataSource=MyOracleDB;UserId=myUsername;Password=myPassword." Also, a connection string for IBM DB2 may be "Driver={IBM DB2 ODBC DRIVER};Database=Sample;Hostname=xxx.xxx.xxx.xxx;Port=xxxxx;Protocol=TCPIP;Uid=name;Pwd=password;". Of note, the connection string defines access and security into the database. As described herein, the software does not physically manipulate or change any of the data in the database in creating reports. Furthermore, the security associated with a particular user ID and password in the connection string is fixed within the software as well so as to prevent report creation from any unauthorized areas in the database.

In an exemplary embodiment, the software may be a flexible API (application programming interface) that is configured to integrate within an existing application, database, etc. Here, the software may be installed as a stand-alone virtual directory and connected to the database. Thus, after installation, the software may be configured (step 2108). The software may include various settings that may be set on a per-user basis. These may be set via a settings file or through code. Some databases contain complex field names that may be confusing to users. In these situations it may be necessary to create reporting views that simplify the data model for the user. Users can be limited to specific views using the "Visible DataSources" setting. Also, custom branding, logo or header controls may be applied to the software. The software may include a robust and flexible security model which inherits rich security credentials from the application, database, etc. For example, various limitations for security may include a user only being able to see records available based on user ID, client ID, etc. Thus, a particular user may be configured to only see certain data sources and not reports that require excluded data sources. Further, non-administrator users may not be able to overwrite reports of to see administrator or sensitive reports.

Also, as part of the configuration, views may be created for the software. In SQL, a VIEW is a virtual table based on the result-set of a SELECT statement. A view contains rows and columns, just like a real table. The fields in a view are fields from one or more real tables in the database. SQL functions such as WHERE and JOIN can be added to a view and present the data as if the data were coming from a single table. Views may optimize and simplify an end-user's experience. Views offer the ability to draw data in from many sources, organize data, and perform many calculations on data before the user uses it as a report data source. As described herein, the present invention offers a direct front end for a database meaning that there is no need to create models, catalogs or secondary schemas. Essentially the present invention does an analysis of the metadata rather than requiring a developer to create a mapping layer. This approach makes integration and maintenance significantly easier in that the present invention does not generally need to be maintained separately from the database. Most databases have evolved in such a way that the schema may be too complex from direct consumption by the user. With views, a series of views may be created that present the user with a simplified and secure perspective to work with.

Finally, end-users may use the software to create reports (step 2110). As described herein, users connect to the server 1800 using a browser, then are served pages and can build reports using the pages. Ultimately, the reports which are built are saved on a server's file system or in a database. The present invention provides an architecture centered on customization. The application may be built using ASP.NET controls. Building the application using controls allows for a highly extensible object oriented architecture. There are four main components which comprise the user interface (UI). These components are pages in the application with which the user interacts. The present invention is designed to operate with end-user performance in mind using full AJAX. For optimal performance of views and database, indexing any field that maybe joined in views, sorted, or filtered by may be done. For example in SQL this can be done using the index tuning wizard. A Report List is first page the user typically interacts with unless given a link to a specific report. This page displays the list of reports. By default, it displays uncategorized reports first (in alphabetical order) and then displays an alphabetized list of the reports by category. If allowed, users may: click the report to view the report in the report viewer page, click modify icon to load the report in the report designer; or click the delete icon to delete the report. A Report Viewer page is used to view a report which has already been designed. Modifications to the report can be made without permanently altering or overwriting the report in any way. If permitted, users may: add fields to the report, filter the report using fields, export the report, navigate to the report list page, load the report into the report designer page, etc.

A Report Designer page allows the user to create and modify reports. The page structure is a tabbed menu at top, followed by a toolbar of icons, and then the page content. Using this page, users will be able to: choose data sources for a report, choose fields which are shown in a report grid and perform simple operations on the fields, create filters to filter report data, create a summary grid using fields and perform simple operations on the fields, create a chart to display data, create gauges to display data, schedule a report for emailing, change visual elements of the report, titles, descriptions, colors, etc., and preview the report after selecting all of the above. A Settings Page is used by the user, typically an admin, to set the most important settings which affect the UI and the application experience in this page. The changes made in the page primarily affect the Report List, Report Viewer, and the Report Designer. A Global.asax file, also known as the ASP.NET application file, is a file that contains code for responding to application-level and session-level events raised by ASP.NET or by HTTP modules. At run time, Global.asax is parsed and compiled. The Global.asax is not a page in the application, it is not served and it is stored in the root directory of the software application. It contains methods which allow customizing appearance of reports, loading, saving and displaying reports.

In order to understand how the pages described above fit into the software and the present invention and how to modify them, a quick overview of ASP.NET web forms and controls is provided herein. Web forms are UI elements which give a web application its look and feel. Web forms contain the ASP.NET controls which the software uses to interact with the user and provide properties, methods, and events for the controls that are placed onto them. Ultimately, the UI elements are rendered into HTML. Web forms are made up of two components: the visual portion (the ASPX file such as the ReportList.aspx page), and the code behind the form, which resides in a separate class file (ReportList.aspx.cs). ASP.NET controls are components that are created and run on the server and encapsulate user-interface and other related functionality. They are used in ASP.NET pages (ASPX) and in ASP.NET code-behind classes (ASPX.CS or .CS). After performing whatever operation they are designed to do, the control renders the appropriate HTML and sends that HTML into the output stream. For example, a DropDownList control will allow binding to a data source, yet the output that is rendered is standard <SELECT> and <OPTION> tags when sent to a browser. However, the same DropDownList control might render WML (Wireless Markup Language) if the target is a portable phone. ASP.NET controls do not necessarily map to any one markup language, but have the flexibility to target the appropriate markup language.

Each page used in the software and the present invention may be a web form which contains the appropriate controls. As an example, let's examine the Report List ASPX page. It can be found in the root application directory (ReportList.aspx). The page contains an include directive so that the code behind (ReportList.aspx.cs) is used if modified. It contains the standard HTML tags, then it includes a header user control which can be customized to applications specifications. The server controls are placed between the <FORM> </FORM> tags. When overriding the default behavior of pages, other user or server controls may be included by editing the code behind for the pages or recompiling the software into a web application. By default, the present invention allows many different settings customization, however, when integrating custom code may have to be written. The software is an object oriented ASP.NET web application, and so uses the concept of "classes" for maximum flexibility and organization. By default, it uses an AdHocConfig class, when code is added for customization, it is adding code to class called CustomAdHocConfig which extends either the Database or File System storage mode base class. The definition for the CustomAdHocConfig class is found in the global.asax file, which is also where custom code is added. Advantageously, the structure of the present invention enables access to all of the relevant methods and properties without having to understand our object model.

Further, once the software is installed on the server, a plurality of users may access the server to operate the software over HTTP through their standard web browser. Note, the users may have the same access as defined in the setup, e.g. through the connection string, or they may have less rights that may be modified during the customization and setup. Additionally, the present invention may support an indirect connection to an SQL database. For example, if it is not possible or allowed to have a web farm with a direct SQL connection, an XMLDataDriver may be used instead. Here, all that is needed is a universal resource locator (URL) of a .ASPX page to provide a connection with a remote database over HTTP without a direct connection to a remote SQL server.

Figure 22:
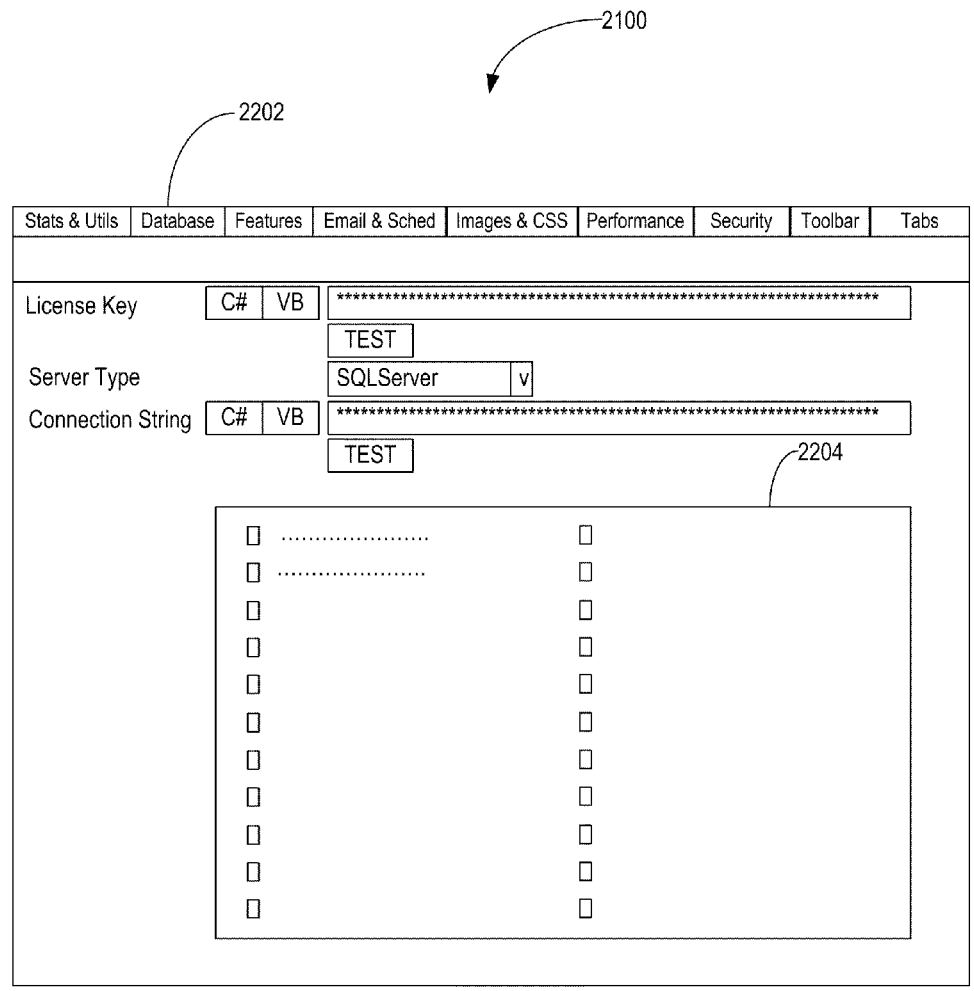
FIG. 22 is a UI screen of a configuration page according to an exemplary embodiment of the present invention

Referring to FIG. 22, a UI screen 2200 illustrates a configuration page according to an exemplary embodiment of the present invention. In particular, the UI screen 2200 illustrates a database setup tab 2202. The database setup tab 2202 includes a line to enter the license key (for C# or VB), a pull down menu to select database type (e.g., SQLServer), and a line to enter a connection string. Furthermore, the database setup tab 2202 may include test buttons to test the license key and/or the connection string. Also, the database setup tab 2202 includes a box 2204 listing a plurality of fields in the database with an associated check box. The box 2204 lists all of the fields in the database that are viewable based upon the permissions in the associated connection string. The boxes may be checked to select a few tables for reporting, such as Orders, Customers, or Sales.

Figure 23:
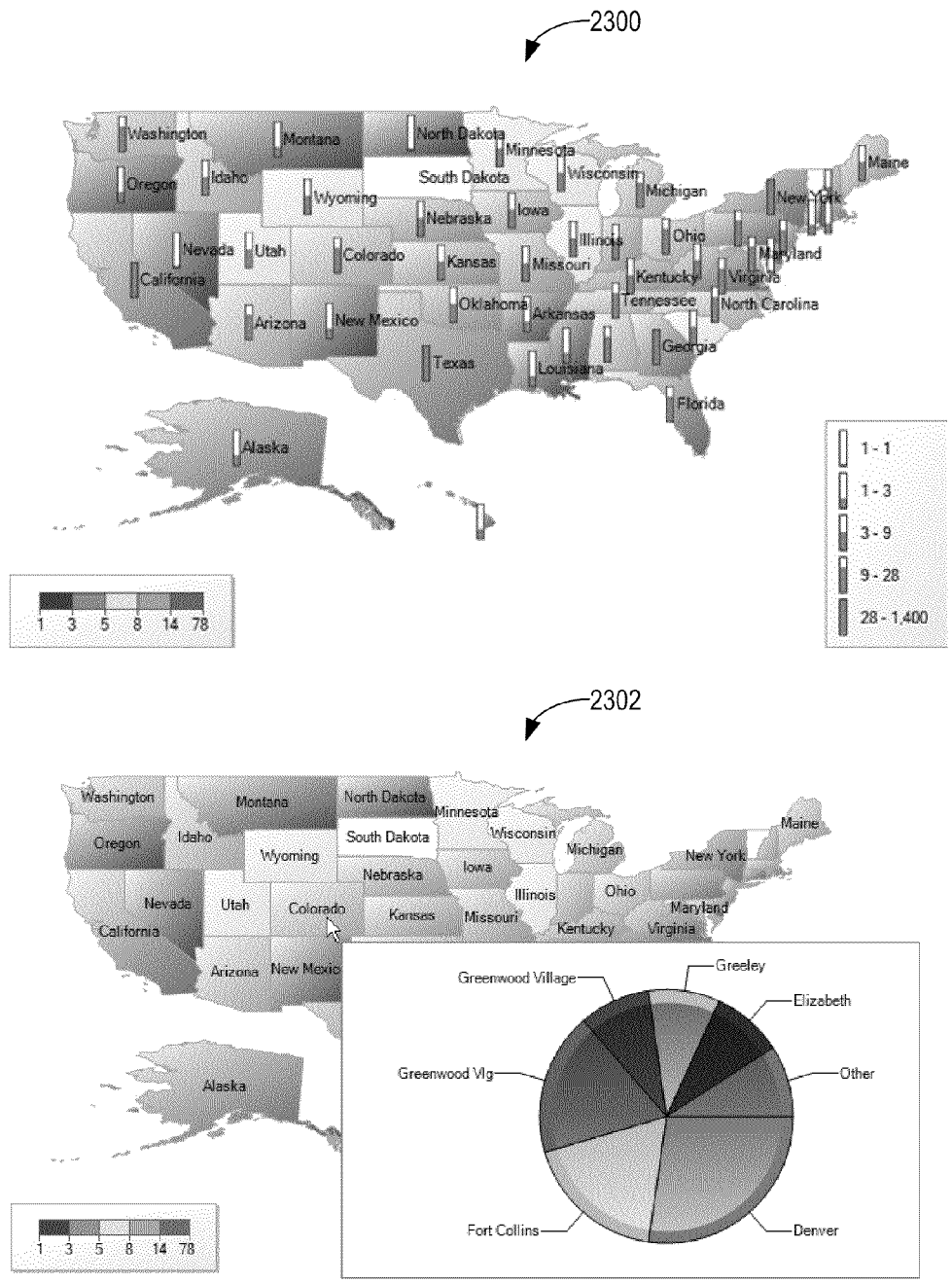
FIG. 23 is a UI screen showing incorporation of visual geographical data in online reports according to an exemplary embodiment of the present invention.

Referring to FIG. 23, UI screens 2300, 2302 illustrate incorporation of visual geographical data in online reports according to an exemplary embodiment of the present invention. The UI screen 2300 is a map of the U.S. with a bar graph illustrating a quantity of some reported value per state. The UI screen 2302 is the same map of the U.S. showing drill-down capabilities that allow a deeper dive deeper with a simple hover. In particular, the UI screen 2320 has a mouse cursor over the state of Colorado and this brings up a pie chart showing data related to Colorado. In an exemplary embodiment, the report system 100 may include preloaded maps, such as the U.S., for example. Alternatively, the report system 100 may allow importation of custom maps.

Figure 24:
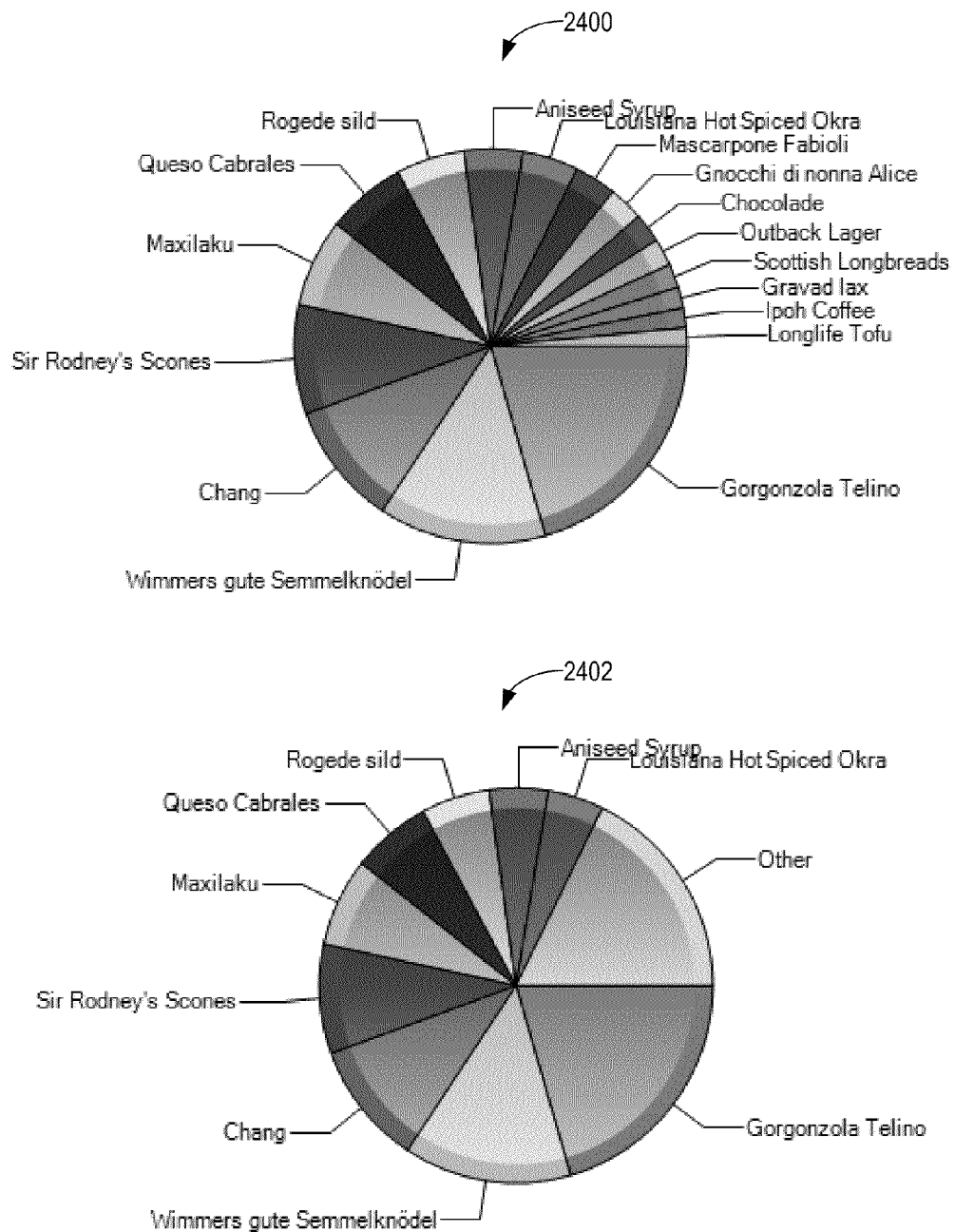
FIG. 24 is a UI screen of streamlining charts in online reports according to an exemplary embodiment of the present invention.

Referring to FIG. 24, UI screens 2400, 2402 illustrate streamlining charts in online reports according to an exemplary embodiment of the present invention. The UI screen 2400 is a pie chart of various items with numerous small items with small quantities. The UI screen 2402 is a streamlined version of the same pie chart as illustrated in the UI screen 2400 with an "other" section consolidating many of the small items. Here, the report system 100 may be configured to allow consolidation for better viewing and reporting. This may include customized consolidation of any fields into larger fields and the like.

Referring to FIG. 25, UI screens 2500, 2502 illustrate a combined line and bar chart and a stacked bar graph according to an exemplary embodiment of the present invention. The UI screen 2500 is a combined line and bar chart that allows dual visualization of multiple metrics simultaneously by adding a line for secondary data. Here, the line chart represents a second set of data from the bar chart. The UI screen 2502 is a stacked bar chart that shows a breakdown of a measure based on categorical data. The report system 100 may be configured to allow these customizations through the UI.

Figure 26:
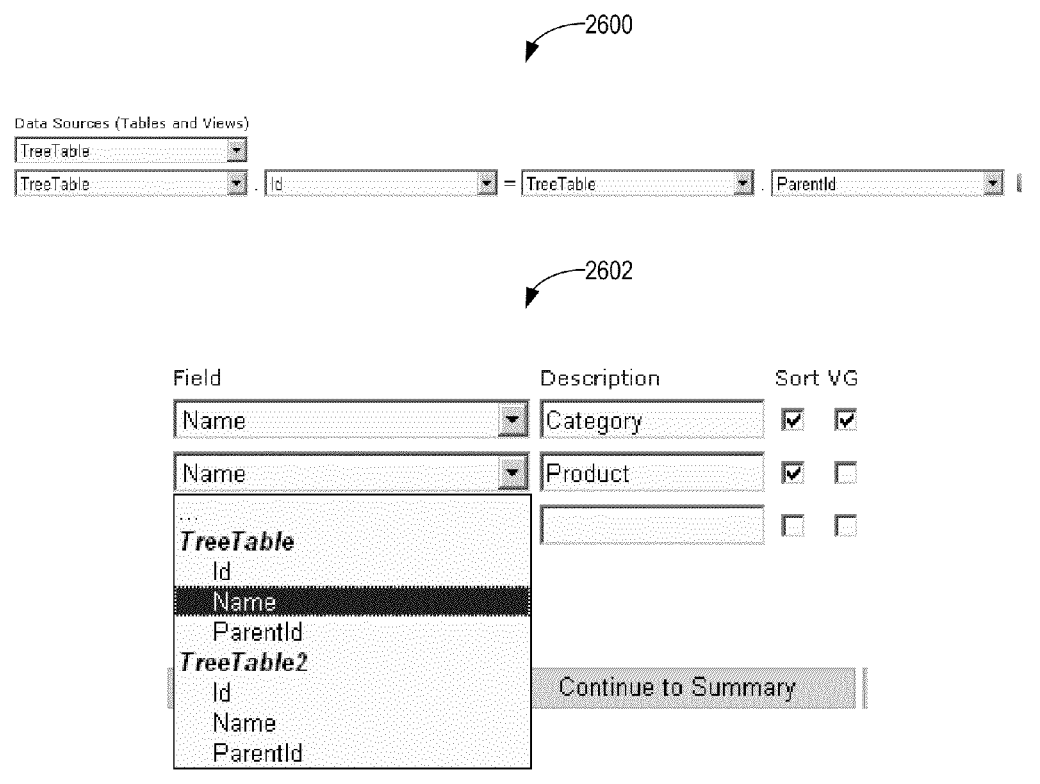

Referring to FIGS. 26-27, a self-join feature for parent-child relationships is illustrated in UI screens 2600, 2602 and through tables 2700, 2702, 2704, 2706 according to an exemplary embodiment of the present invention. In the present invention, self-join allows for parent-child relationships to be accessed from the Data Sources tab as shown in UI screen 2600. Further, the same table can be used as a secondary child table within a Report Designer in UI screen 2602. In FIG. 27, for example, suppose there is a tree in a database with an arbitrary depth. Typically, it is implemented by a single table 2700 with two columns: ID and ParentID. Records with ParentID=0 are considered as top-level records, so the table 2700 illustrates top-level category "Beverages" with two children—"Chai" and "Chang". To show data from such table as a tree you have to self-join this table on Id=ParentId as shown in the screen 2600. Now there are two "TreeTable" data sources joined on Id=ParentId. TreeTable.Name now contains name of category, while TreeTable2.Name contains name of the product—exactly as in the case of joining two different datasources—say, Categories and Products on Categories.Id=Products.CategoryId and getting records with field Categories.Name and Products.Name as shown in FIG. 26. The resulting report is illustrated in the tables 2702, 2704, 2706.

Figure 28:
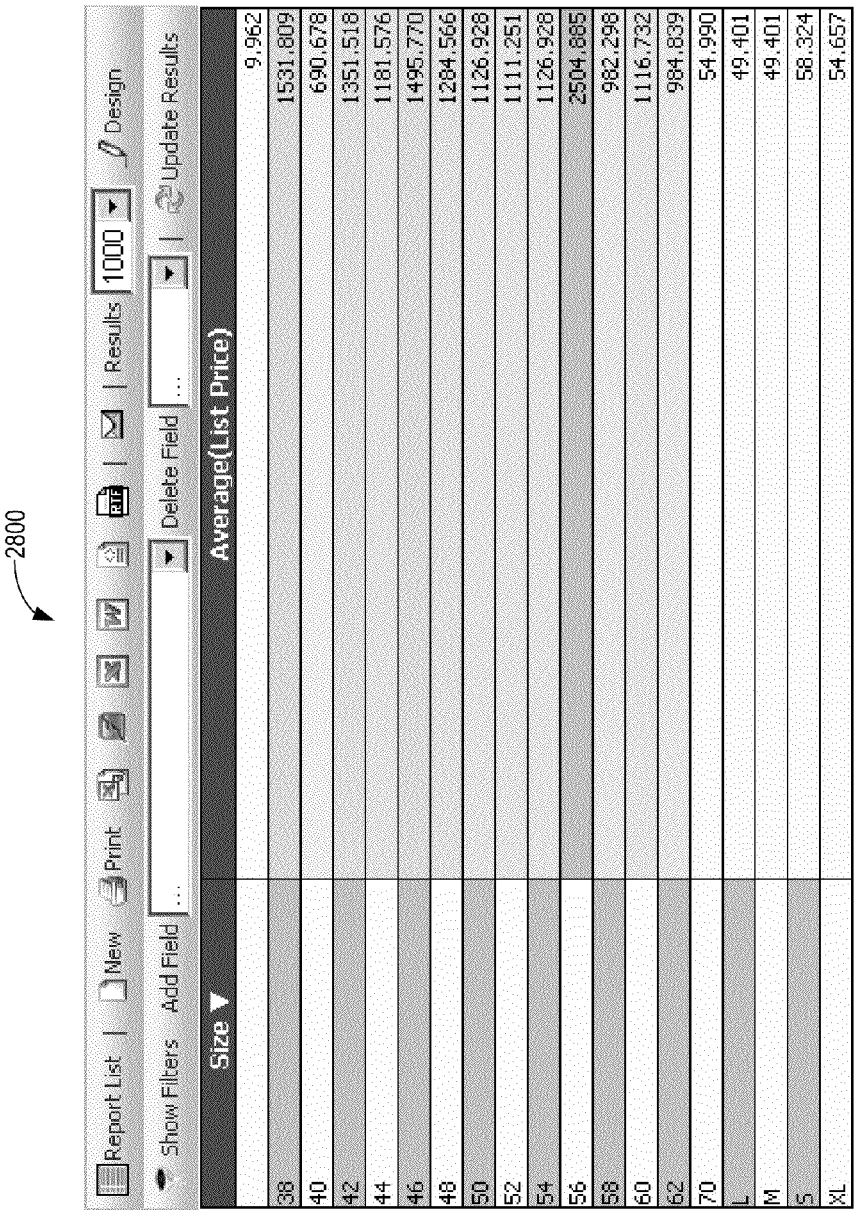
FIG. 28 is a UI screen of visual enhancements in the fields report according to an exemplary embodiment of the present invention.

Referring to FIG. 28, a UI screen 2800 illustrates visual enhancements in the fields report according to an exemplary embodiment of the present invention. Typically, the fields report is a list or table which is hard to glean information from (versus, for example, a chart). The UI screen 2800 illustrates a usual table of average price of product against size ordered by size. Typically, these numbers would be hard to perceive and deduce anything from. However, the present invention utilizes gradient shading in the UI screen 2800 depending on cells values applied. From viewing the UI screen, it may be understood that there are two outstanding sizes—56 (expensive) and 70 (cheap), while all other sizes have roughly equal cost. Furthermore, the UI screen 2800 may also include a "heat map". The heat map looks similar to gradient shading, but much more convenient for pivot reports, and can be applied with single click—by just setting "Heat Map" value in the "format" combo box for pivot cells.

Referring to FIG. 29, a UI screen 2900 illustrates pivoted table customization according to an exemplary embodiment of the present invention. Specifically, the present invention supports a complete set of settings for pivot columns for independent customization. For example, in the UI screen 2900, report is shown with a field Total due having italic font style enabled, while pivot columns for years have bold font style enabled in Advanced properties.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A database reporting method, comprising:
    installing reporting software on a server, wherein the reporting software is based on a type of database associated with a database;
    providing a connection string to the reporting software for the database, wherein the connection string comprises access level to the database and the method of connecting to the database;
    creating a plurality of views in the reporting software;
    providing one or more end users access to the reporting software through one of Hypertext Transfer Protocol and Hypertext Transfer Protocol Secure, wherein the one or more end users utilize a web browser comprising scripting capabilities;
    presenting fields for a report to one of the one or more end users; and
    self-joining the fields based on both parent-child relationships of the fields and a scorecarding algorithm, wherein self-joining the fields comprises adding an additional data source to an existing data source such that a resulting new data source has at least one field in common with the existing data source.

2. The database reporting method of claim 1, further comprising:
    obtaining a copy of the reporting software, wherein the reporting software includes support for any of SQL Server 2000 or 2005, Oracle v9 and above, MySQL, IBM DB2, and wherein the reporting software comprises a C# edition and a Visual Basic .NET edition.

3. The database reporting method of claim 1, wherein the access level in the connection string is fixed and applied to all reports generated by the reporting software, and wherein an operator may edit the access level to provide one of the one or more users less than the access level.

4. The database reporting method of claim 1, further comprising:
    integrating the reporting software into an existing web application, wherein the reporting software comprises an application programming interface.

5. The database reporting method of claim 4, further comprising:
    adjusting the reporting software via one of a settings file or customizable code using C# or Visual Basic .NET.

6. The database reporting method of claim 4, further comprising:
    incorporating a custom logo or branding into the reporting software.

7. The database reporting method of claim 1, further comprising:
    providing a graphical user interface to the one or more end users, wherein the reporting software through the graphical user interface provides a direct front end to the database without requiring a developer to create models, catalogs, or secondary schema for the database.

8. The database reporting method of claim 7, wherein the reporting software is configured to provide an analysis of metadata associated with the database rather than requiring the developer to create a mapping layer.

9. The database reporting method of claim 7, wherein the graphical user interface is configured to prevent illegal operations in the database based on the type of database and particular fields within the database.

10. The database reporting method of claim 1, further comprising:
creating a report from data in the database based on input from one of the one or more users.

11. The database reporting method of claim 1, further comprising:
showing a table of the fields; and
utilizing one of a heat map or gradient shading in the fields to optimize presentation of data associated with the fields.

12. A system, comprising:
a database comprising a database type;
a web server comprising a reporting system, wherein the reporting system comprises computer-executable instructions and is configured to connect to the database over a network utilizing connection information, wherein the connection information comprises access level to the database and the method of connecting to the database; and
one or more user processors communicatively coupled to the web server over one of Hypertext Transfer Protocol and Hypertext Transfer Protocol Secure, wherein one or more users utilize a web browser comprising scripting capabilities to access the reporting system and to generate reports thereon based on the access level to the database;
wherein the reporting system presents fields for a report to one of the one or more users; and
wherein the reporting system self-joins the fields based on both parent-child relationships of the fields and a scorecarding algorithm, wherein self-joining the fields comprises adding an additional data source to an existing data source such that a resulting new data source has at least one field in common with the existing data source.

13. The system of claim 12, wherein the access level in the connection information is fixed and applied to all reports generated by the reporting software, and wherein an operator may edit the access level to provide one of the one or more users less than the access level.

14. The system of claim 12, further comprising a network communicatively coupling the database, the web server, and the one or more users, wherein the database and the web server are collocated and connected on a local network.

15. The system of claim 12, further comprising a network communicatively coupling the database, the web server, and the one or more users, wherein each of the database, the web server, and the one or more users are external to one another and connected via the network.

16. A web server, comprising:
a network interface configured to connect to a user through a web browser and to a database comprising one of a plurality of database types; and
a processor coupled to the network interface, wherein the processor is configured to execute computer-executable instructions configured to:
operate a reporting software, wherein the reporting software is based on the one of a plurality of database types;
connect to a database via the reporting software, wherein the connection comprises an access level to the database;
create a plurality of views in the reporting software; and
provide one or more end users access to the reporting software through one of Hypertext Transfer Protocol and Hypertext Transfer Protocol Secure over the network interface, wherein the one or more end users utilize a web browser comprising scripting capabilities;
wherein the reporting software presents fields for a report to one of the one or more end users; and
wherein the reporting software self-joins the fields based on both parent-child relationships of the fields and a scorecarding algorithm, wherein self-joining the fields comprises adding an additional data source to an existing data source such that a resulting new data source has at least one field in common with the existing data source.

* * * * *